US012220892B2

(12) United States Patent
Wetsch et al.

(10) Patent No.: US 12,220,892 B2
(45) Date of Patent: Feb. 11, 2025

(54) CRUMPLING MECHANISM FOR CREATING DUNNAGE

(71) Applicant: Pregis Innovative Packaging LLC, Deerfield, IL (US)

(72) Inventors: Thomas D. Wetsch, St. Charles, IL (US); Robert Tegel, Huntley, IL (US)

(73) Assignee: Pregis Innovative Packaging LLC, Bannockburn, IL (US)

( * ) Notice: Subject to any disclaimer, the term of this patent is extended or adjusted under 35 U.S.C. 154(b) by 303 days.

(21) Appl. No.: 15/250,501

(22) Filed: Aug. 29, 2016

(65) Prior Publication Data

US 2016/0361887 A1 Dec. 15, 2016

Related U.S. Application Data

(62) Division of application No. 13/784,630, filed on Mar. 4, 2013, now Pat. No. 9,427,930, and a division of (Continued)

(51) Int. Cl.
*B31D 5/00* (2017.01)

(52) U.S. Cl.
CPC .... *B31D 5/0052* (2013.01); *B31D 2205/0041* (2013.01); *B31D 2205/0047* (2013.01); (Continued)

(58) Field of Classification Search
CPC .................... B31D 5/0052; B31D 5/04; B31D 2205/0041; B31D 2205/0047; (Continued)

(56) References Cited

U.S. PATENT DOCUMENTS 1,571,594 A * 2/1926 Lorenz ...................... B31F 1/07 425/336
2,786,399 A * 3/1957 Mason ................. B31D 5/0082 210/442

(Continued)

*Primary Examiner* — Sameh Tawfik
(74) *Attorney, Agent, or Firm* — Fox Rothschild LLP

(57) ABSTRACT

A dunnage crumpling apparatus is provided having first and second entry-side crumpling members and first and second exit-side crumpling members. The first and second entry-side crumpling members define an entry therebetween. The first and second exit-side crumpling members define an exit therebetween that is disposed along the longitudinal path downstream of the entry. A crumpling zone being defined between the entry and exit. The first entry-side crumpling member is configured for moving at an first rate and is associated with the second entry-side crumpling member for moving sheet material through the entry in a first direction along a longitudinal path at an entry rate. The first exit-side crumpling member is configured for moving at an second rate and is associated with the second exit-side crumpling member for moving the sheet material through the exit in the first direction along the path at a exit rate that is slower than the entry rate to crumple the sheet material for producing dunnage. The entry and exit-side crumpling members are displaced laterally along the path with respect to each other to cause shearing of the sheet within the crumpling zone.

24 Claims, 22 Drawing Sheets

Related U.S. Application Data application No. 12/550,294, filed on Aug. 28, 2009, now Pat. No. 8,388,508.

(52) U.S. Cl.
CPC ................ *B31D 2205/0064* (2013.01); *B31D 2205/007* (2013.01); *B31D 2205/0082* (2013.01); *B31D 2205/0088* (2013.01); *Y10T 428/24446* (2015.01)

(58) Field of Classification Search
CPC ...... B31D 2205/0064; B31D 2205/007; B31D 2205/0082; B31D 2205/0088; Y10T 428/24446
USPC .......................................................... 493/464
See application file for complete search history.

(56) References Cited

U.S. PATENT DOCUMENTS

| | | | | |
|---|---|---|---|---|
| 2,924,154 | A * | 2/1960 | Russell | B31D 5/0082 493/464 |
| 4,384,442 | A * | 5/1983 | Pendleton | B29C 49/0047 53/554 |
| 5,712,020 | A * | 1/1998 | Parker | B31D 5/006 428/152 |
| 5,888,183 | A | 3/1999 | Ruthenberg | |
| 5,938,580 | A | 8/1999 | Siekmann | |
| 6,017,299 | A * | 1/2000 | Ratzel | B31D 5/0047 493/464 |
| 6,019,715 | A | 2/2000 | Ratzel et al. | |
| 6,106,452 | A * | 8/2000 | Baumuller | B31D 5/0047 493/464 |
| 6,179,765 | B1 * | 1/2001 | Toth | B26D 7/24 493/360 |
| 6,783,489 | B1 | 8/2004 | Ratzel et al. | |
| 7,258,657 | B2 | 8/2007 | Ratzel et al. | |
| 7,771,338 | B2 | 8/2010 | Wetsch et al. | |
| 7,955,245 | B2 | 6/2011 | Cheich et al. | |
| 9,694,555 | B2 | 7/2017 | Wetsch et al. | |
| 2003/0139272 | A1 * | 7/2003 | Simmons, Jr. | B31D 5/0047 493/394 |
| 2007/0122575 | A1 | 5/2007 | Slovencik | |
| 2009/0023570 | A1 | 1/2009 | Kung et al. | |
| 2009/0075800 | A1 * | 3/2009 | Wetsch | B31D 5/006 493/464 |
| 2009/0082187 | A1 * | 3/2009 | Cheich | B31D 5/0047 493/350 |
| 2011/0053743 | A1 | 3/2011 | Wetsch et al. | |

* cited by examiner

CRUMPLING MECHANISM FOR CREATING DUNNAGE

CROSS REFERENCE TO RELATED APPLICATION

This application is a divisional of U.S. application Ser. No. 13/784,630 filed Mar. 4, 2013, now U.S. Pat. No. 9,427,930, which is a divisional of U.S. application Ser. No. 12/550,294 filed Aug. 28, 2009, now U.S. Pat. No. 8,388, 508, the entire contents of which are expressly incorporated herein by reference thereto.

FIELD

A dunnage system for processing material into dunnage is herein described. The dunnage system includes a crumpling mechanism to crumple material for providing dunnage.

BACKGROUND

Products to be transported and/or stored often are packed within a box or other container. In many instances, however, the shape of the product does not match the shape of the container. Most containers utilized for transporting products have the general shape of a square or rectangular box and, of course, products can be any shape or size. To fit a product within a container and to safely transport and/or store the product without damage to the product, the void space within the container is typically filled with a packing or cushioning material.

The protective-packing material utilized to fill void space within a container is often a lightweight, air-filled material that may act as a pillow or cushion to protect the product within the container. Many types of protective packaging have been used. These include, for example, foam products, inflatable pillows, and paper dunnage.

In the context of paper-based protective packaging, rolls of paper sheet are crumpled to produce the dunnage. Most commonly, this type of dunnage is created by running a generally continuous strip of paper into a machine and then cutting the crumpled sheet material into a desired length to effectively fill void space within a container holding a product. Typically, paper material is crumpled longitudinally so as to form a long strip of dunnage having many folds or pleats. Because the paper has fold spaces and/or pleats, the crumpled paper can be very effective at protecting and cushioning a product contained within the container, and may effectively prevent damage to the product during transport and/or storage.

Various machines for dunnage conversion have been developed. US 2009/0023570 discloses a machine for converting sheet material into a dunnage product. The machine includes a forming assembly for shaping the sheet material into a continuous strip of dunnage having a three-dimensional shape, a pulling assembly for advancing the sheet material through the forming assembly, and a severing assembly for severing the dunnage strip into a severed section of dunnage.

US 2009/0082187 discloses a dunnage conversion machine that converts a sheet stock material into a multi-ply dunnage product. The machine includes a feed mechanism that advances a sheet stock material and a connecting mechanism downstream of the feed mechanism that retards the passage of the sheet stock material by feeding the stock material therethrough at a slower rate than the feed mechanism. The connecting mechanism connects multiple overlapping layers of sheet stock material together as they pass therethrough, including connecting at least one crumpled sheet to one side of another sheet.

Each of U.S. Pat. Nos. 7,258,657, 6,783,489, and 6,019, 715 disclose cushioning conversion machines that convert material from a stock supply roll to dunnage. These patents disclose a cushioning conversion machine that converts a two-dimensional stock material into a three-dimensional cushioning product. The machine generally comprises a housing through which the stock material passes along a path; and a feeding/connecting assembly which advances the stock material from a source thereof along said path, crumples the stock material, and connects the crumpled stock material to produce a strip of cushioning. The feeding/connecting assembly includes upstream and downstream components disposed along the path of the stock material through the housing, at least the upstream component being driven to advance the stock material toward the downstream component at a rate faster than the sheet-like stock material can pass from the downstream component to effect crumpling of the stock material therebetween to form a strip of cushioning. Additionally, at least one of the upstream and downstream components includes opposed members between which the stock material is passed and pinched by the opposed members with a pinch pressure; and a tension control mechanism is provided for adjusting the amount of pinch pressure applied by the opposed members to the stock material. The machine may include a turner bar to enable alternative positioning of a stock supply roll.

BRIEF DESCRIPTION

Figure 1:
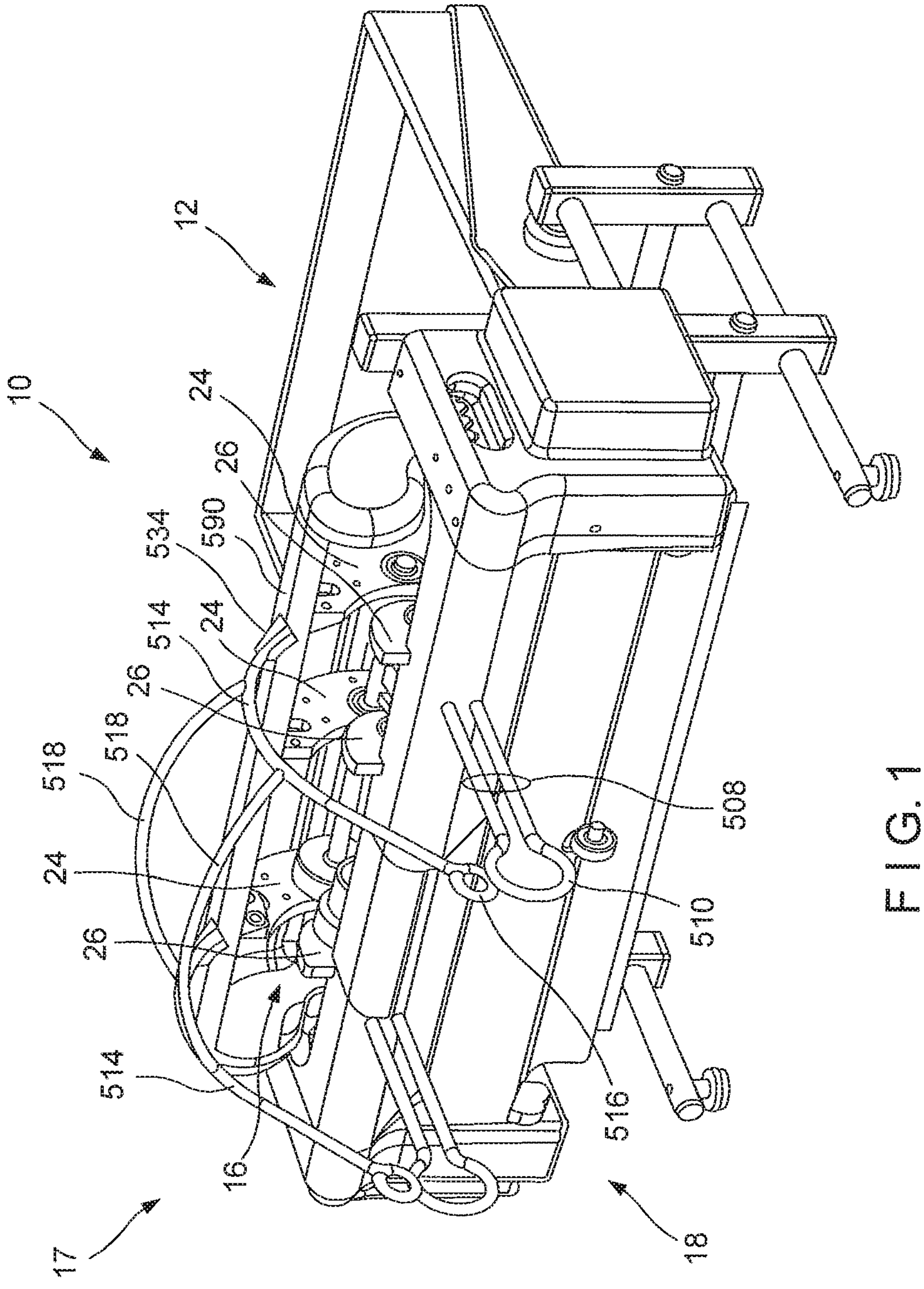
FIG. 1 is a perspective view of a dunnage system.
Figure 9A:
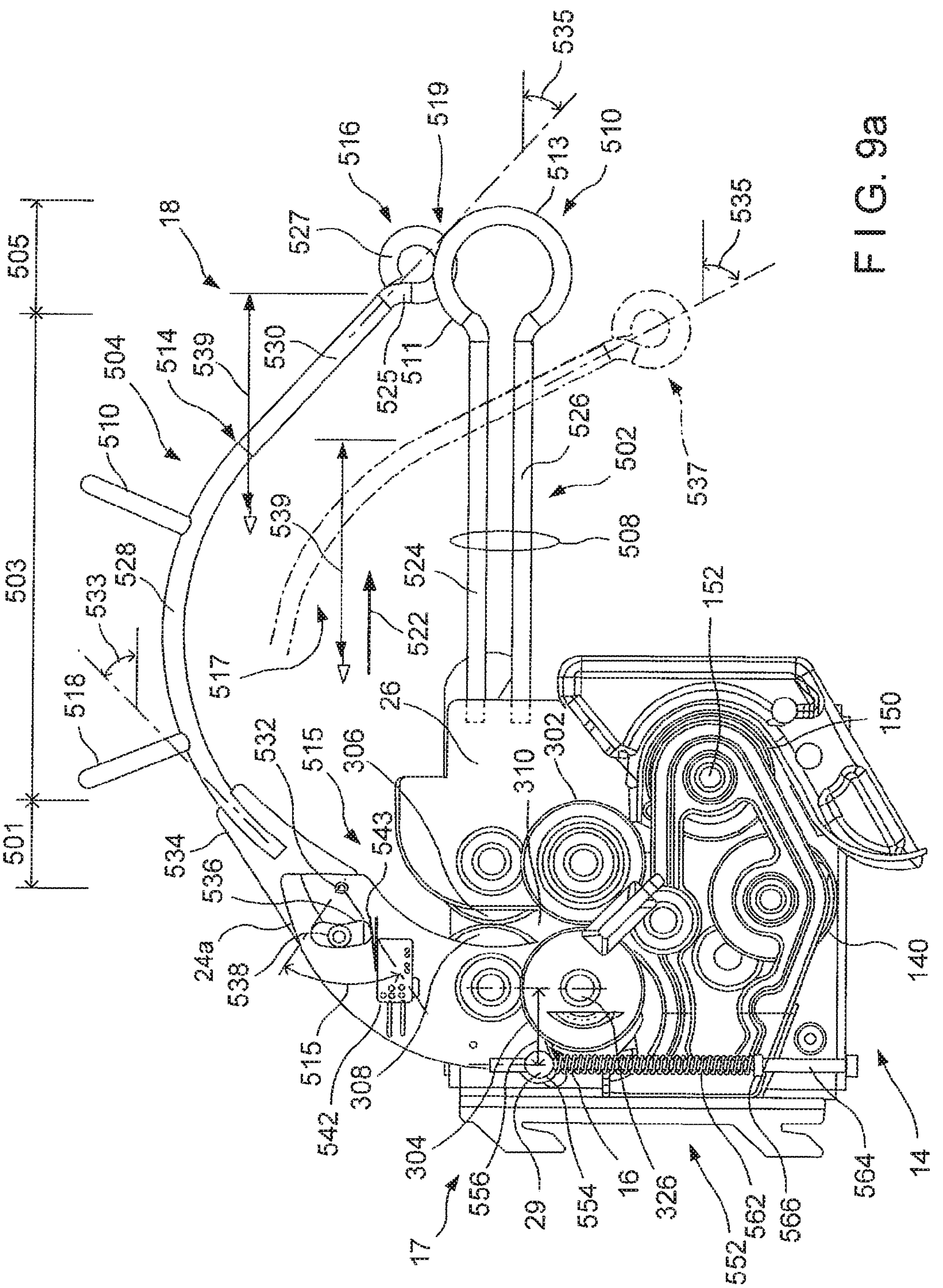
Figure 9B:
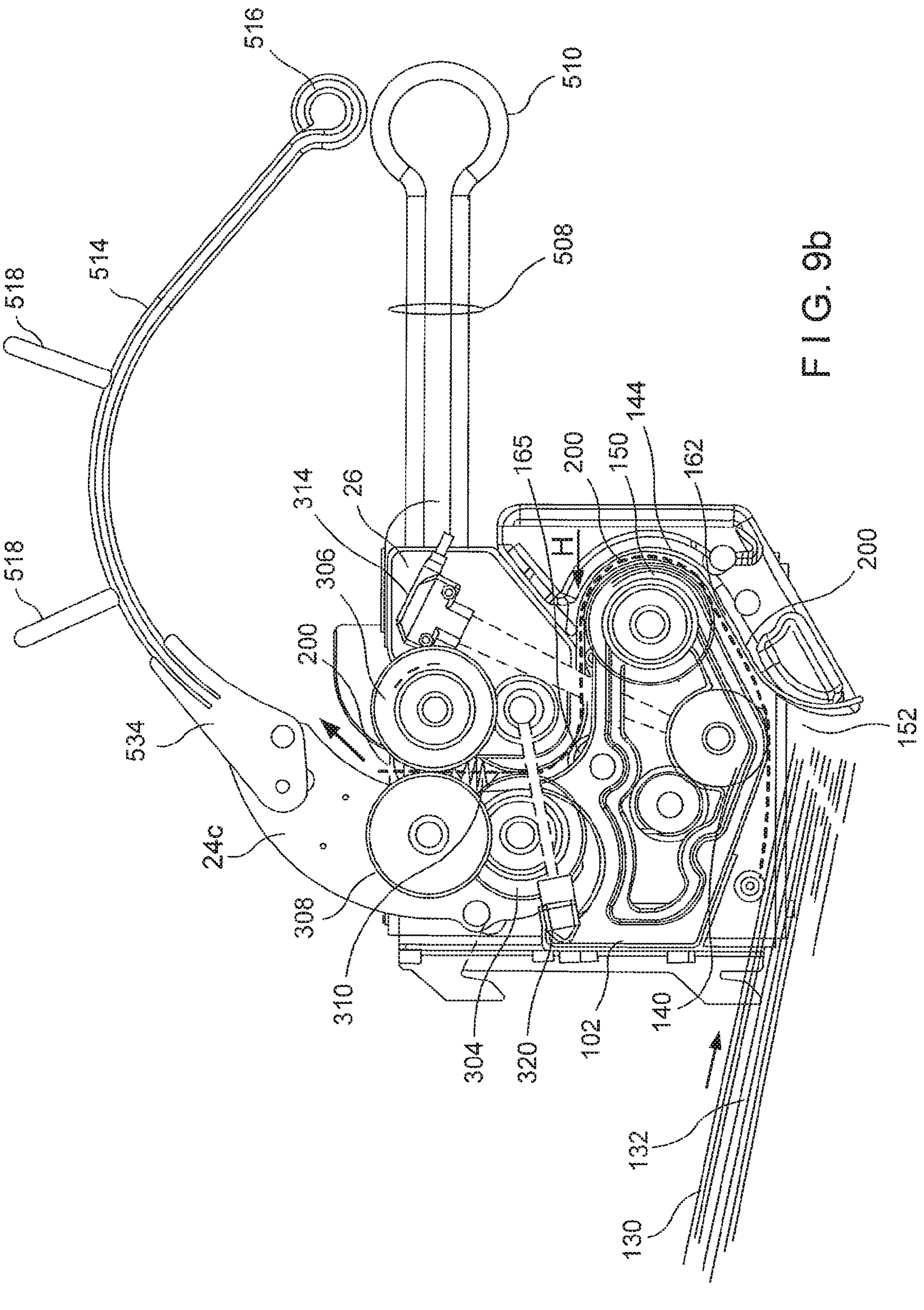
Figure 10:
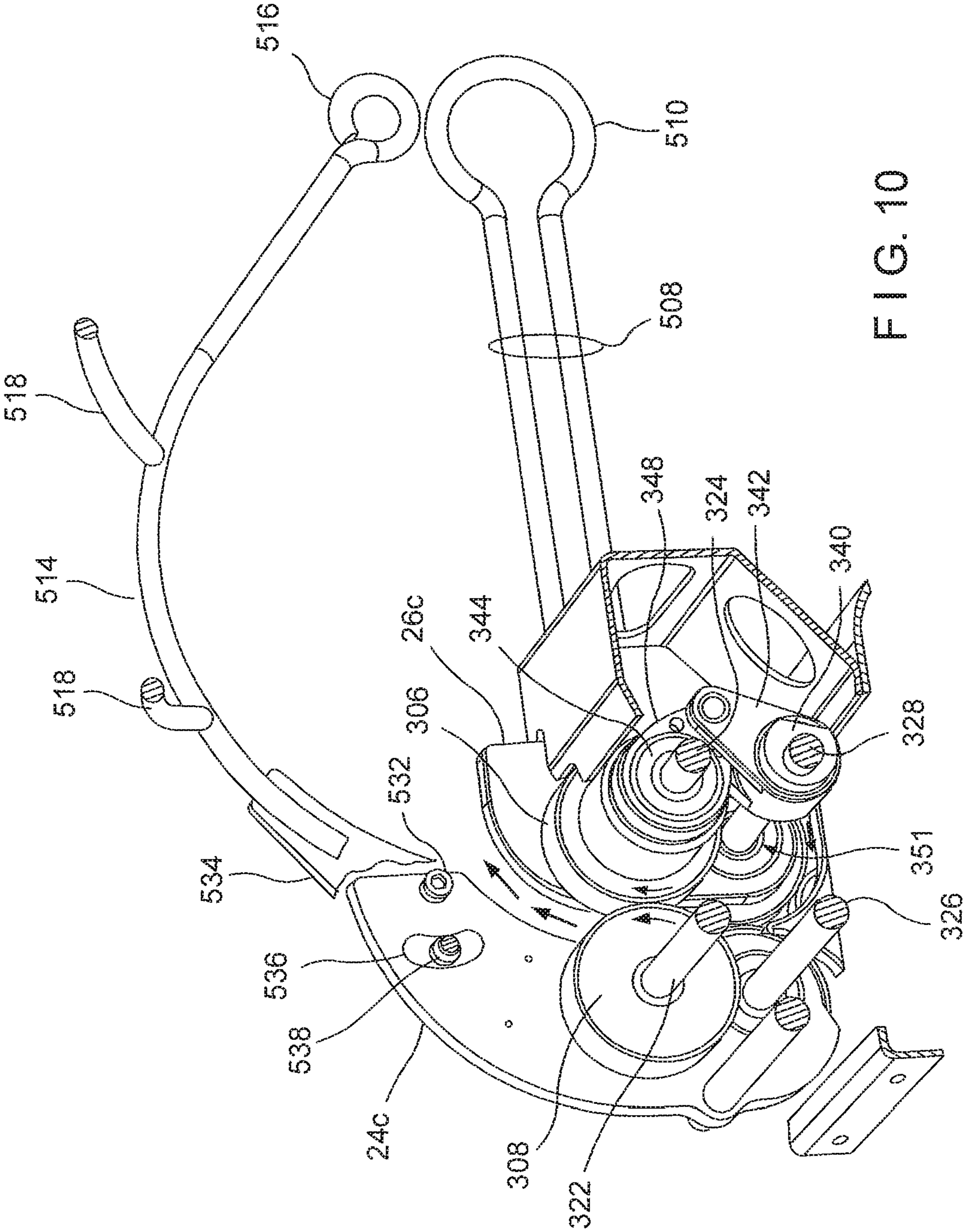
Figure 11:
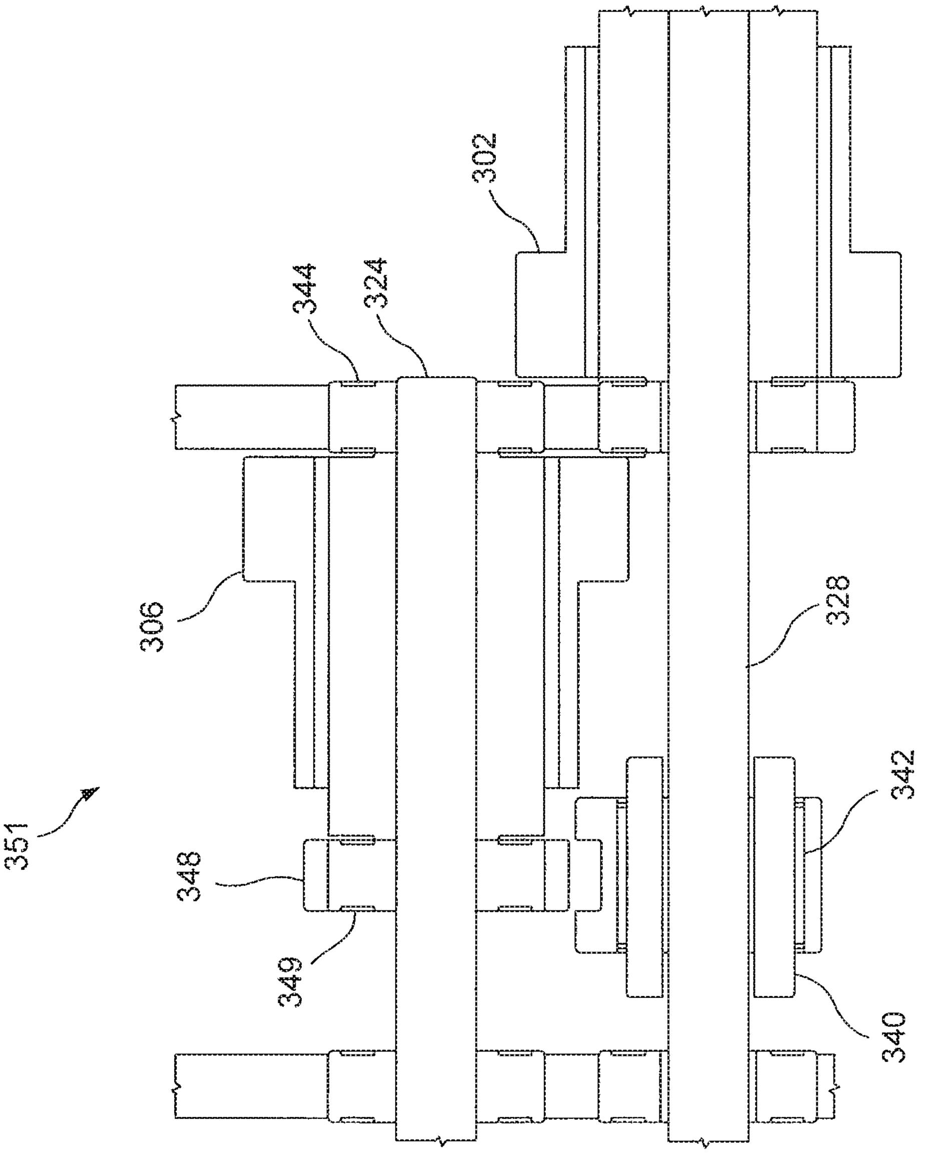
Figure 12:
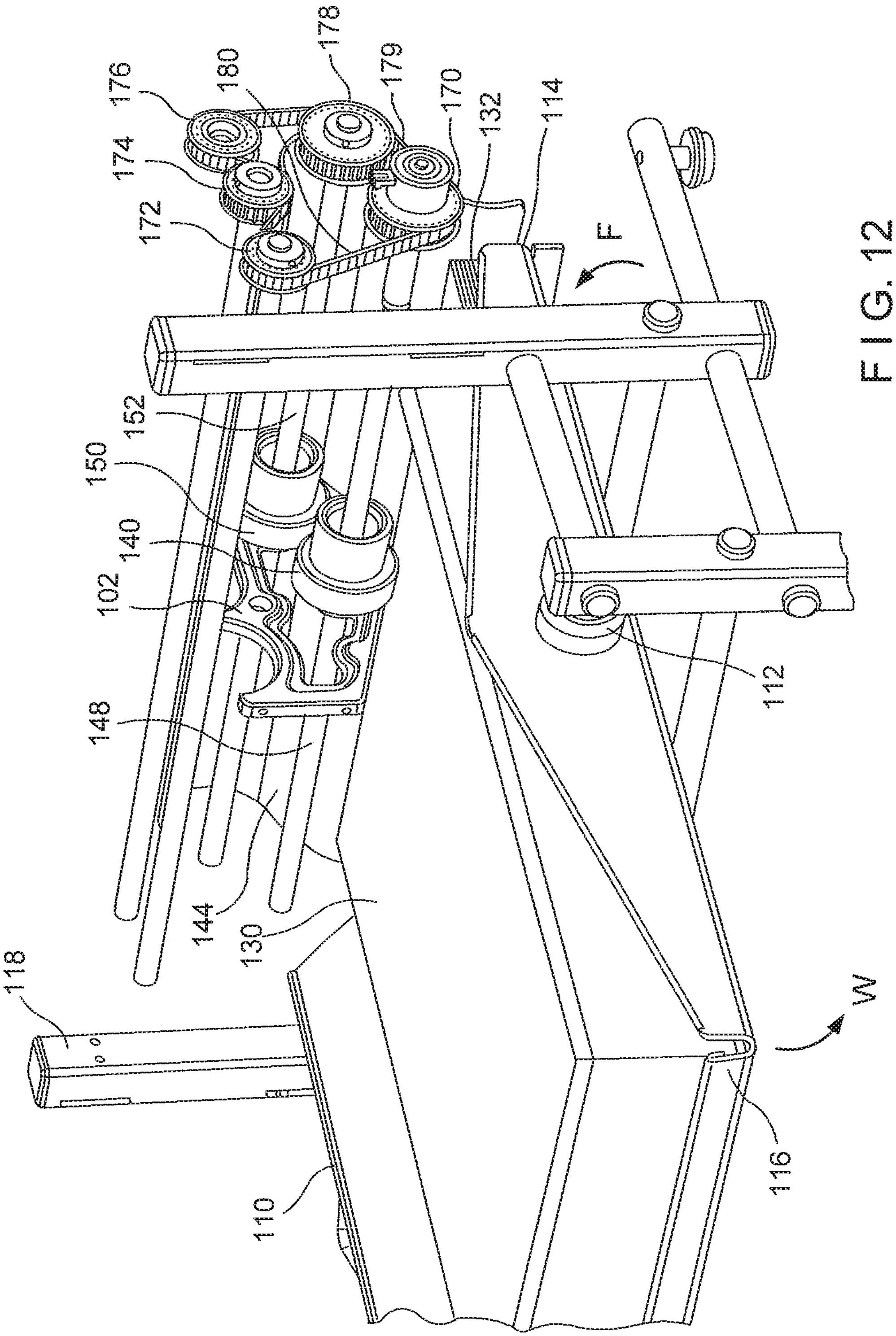
Figure 13:
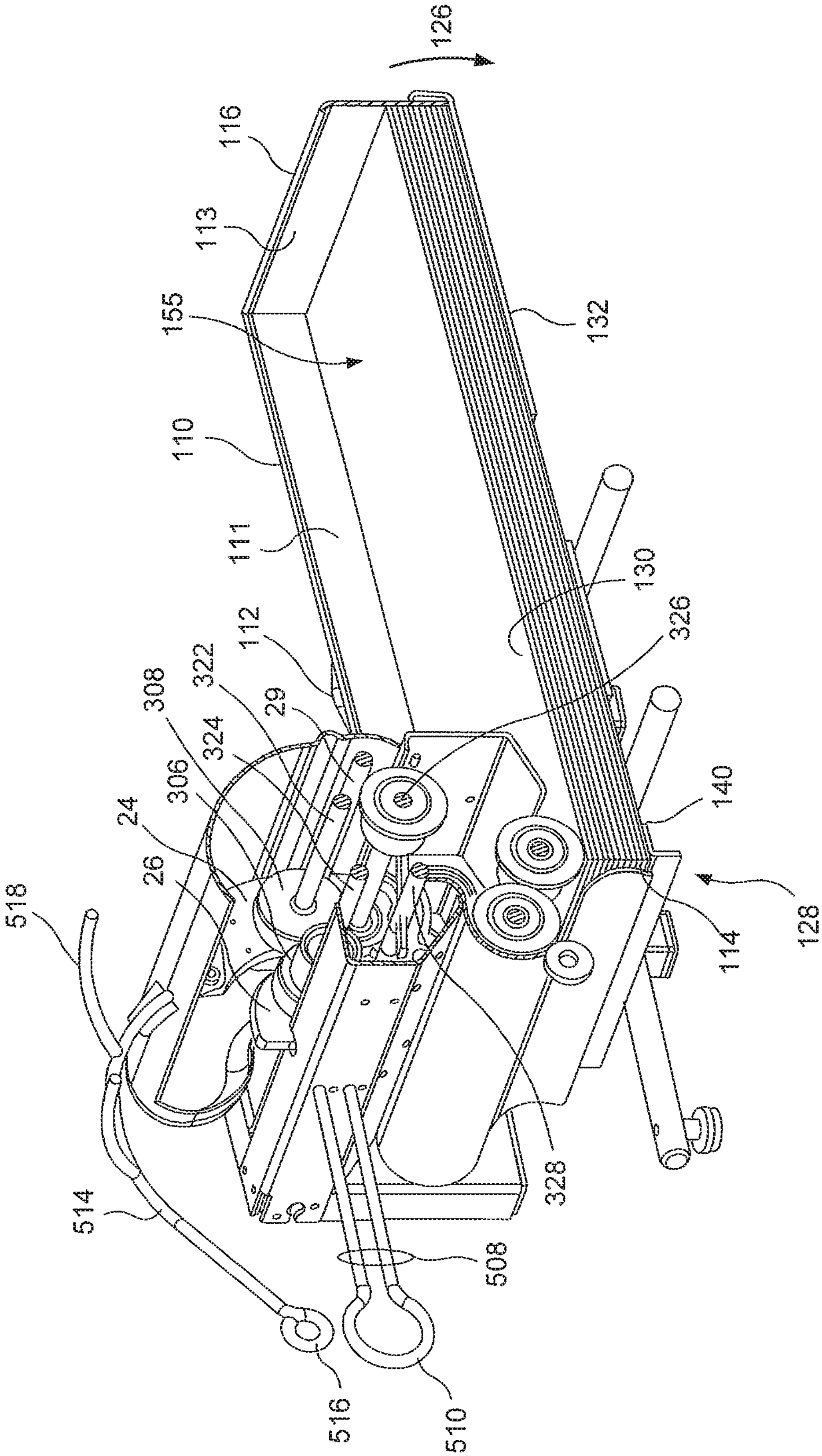
Figure 14:
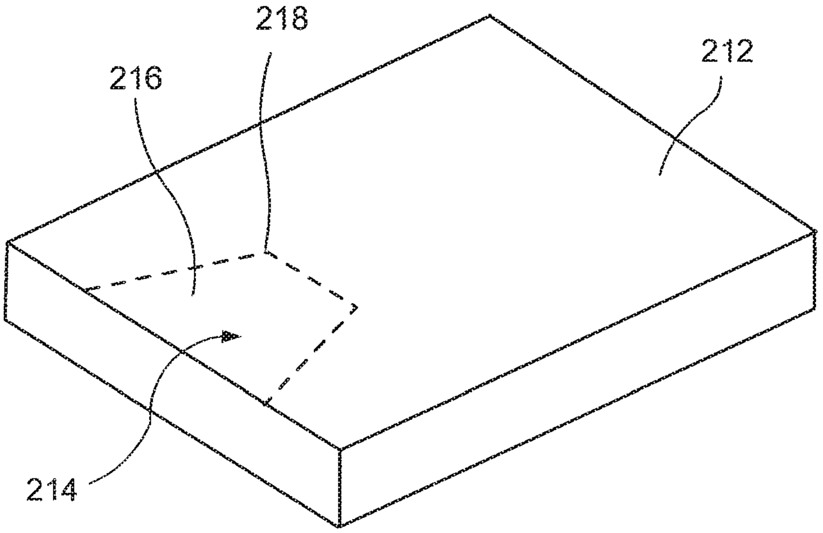
Figure 15:
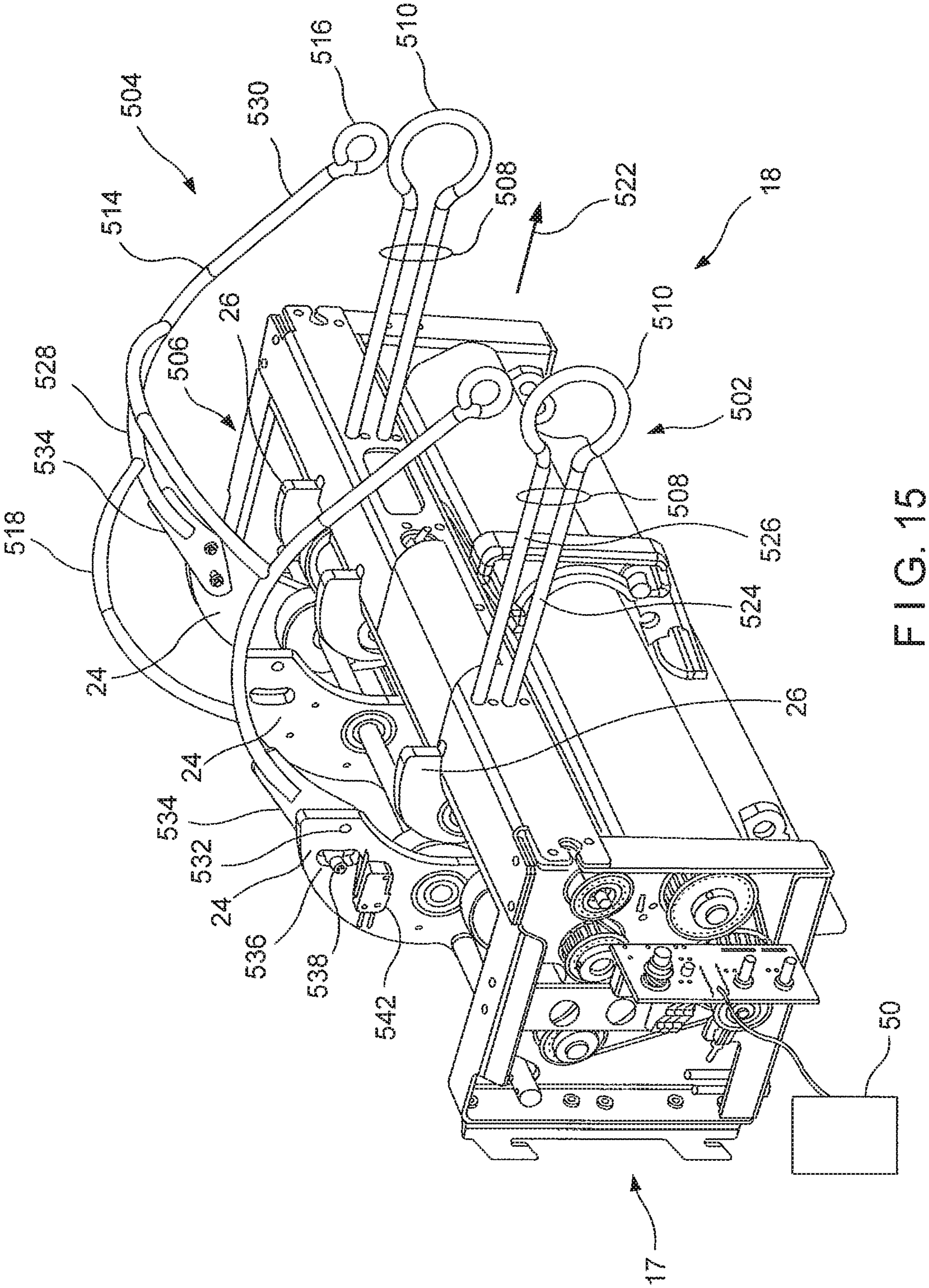
Figure 16:
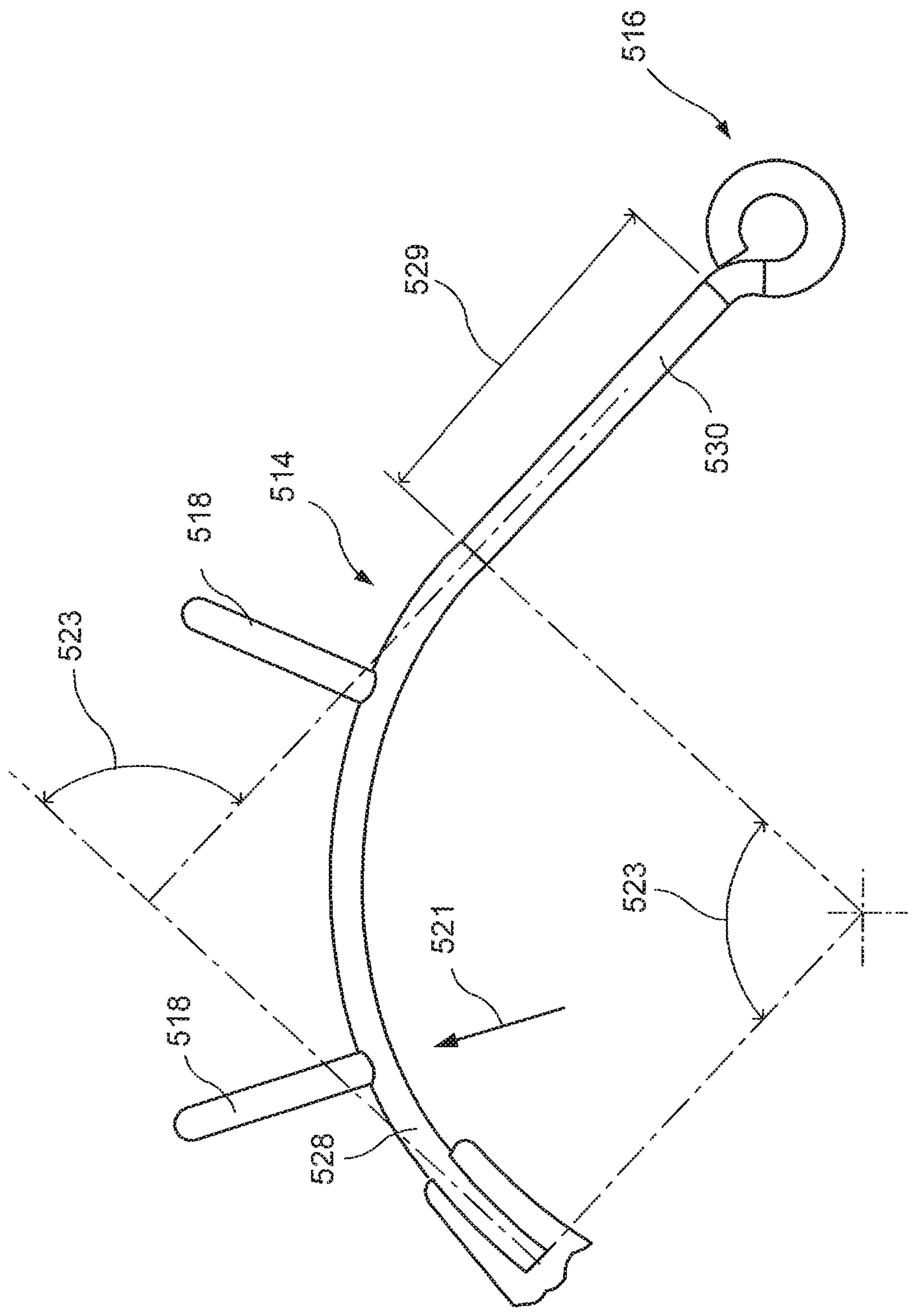
Figure 17:
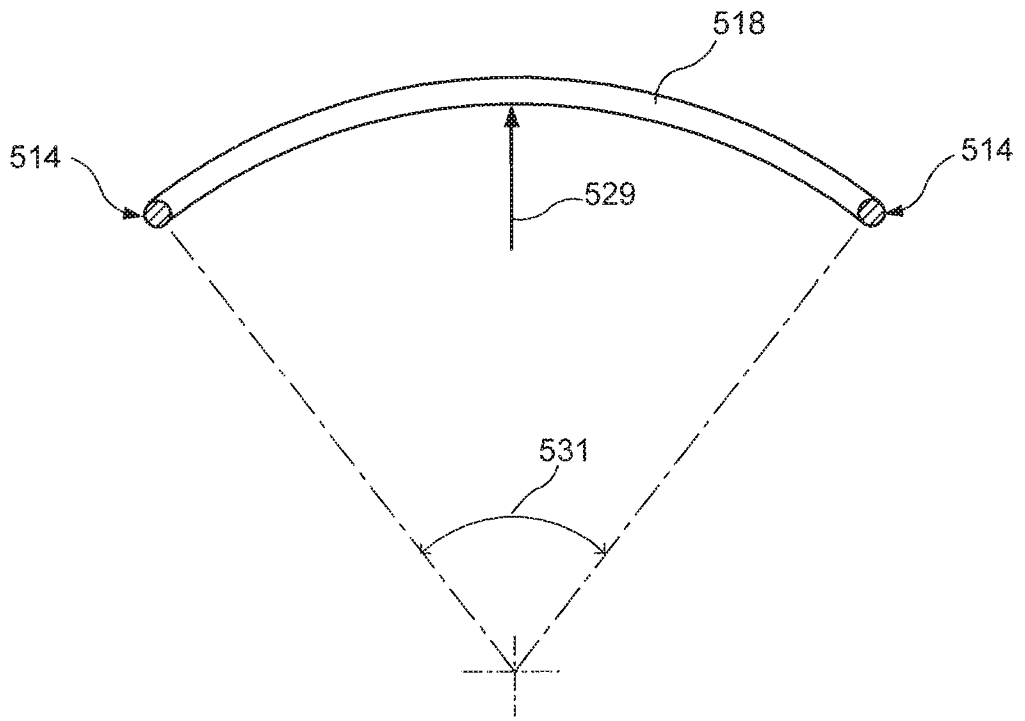
Figure 18:
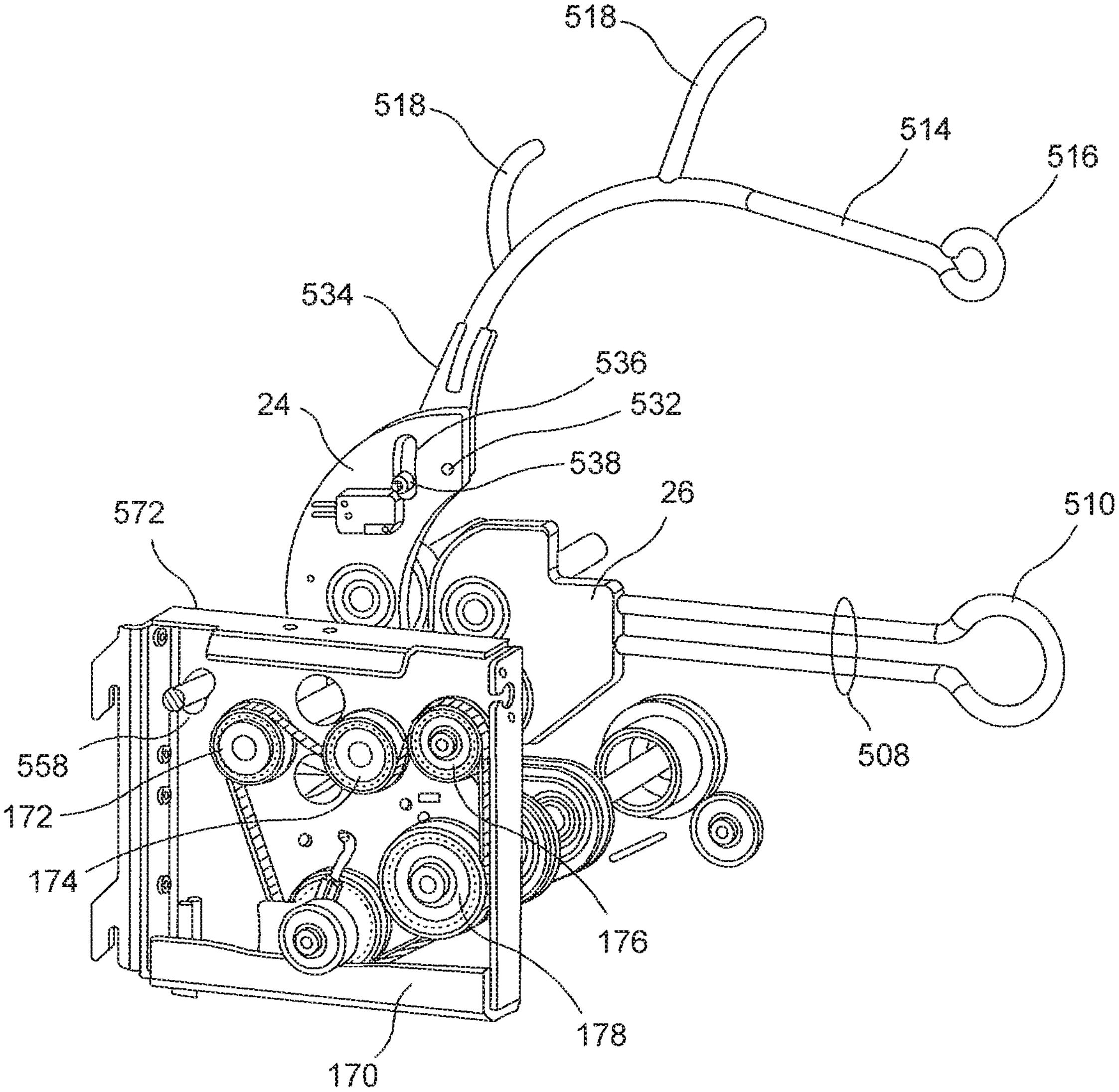
Figure 19:
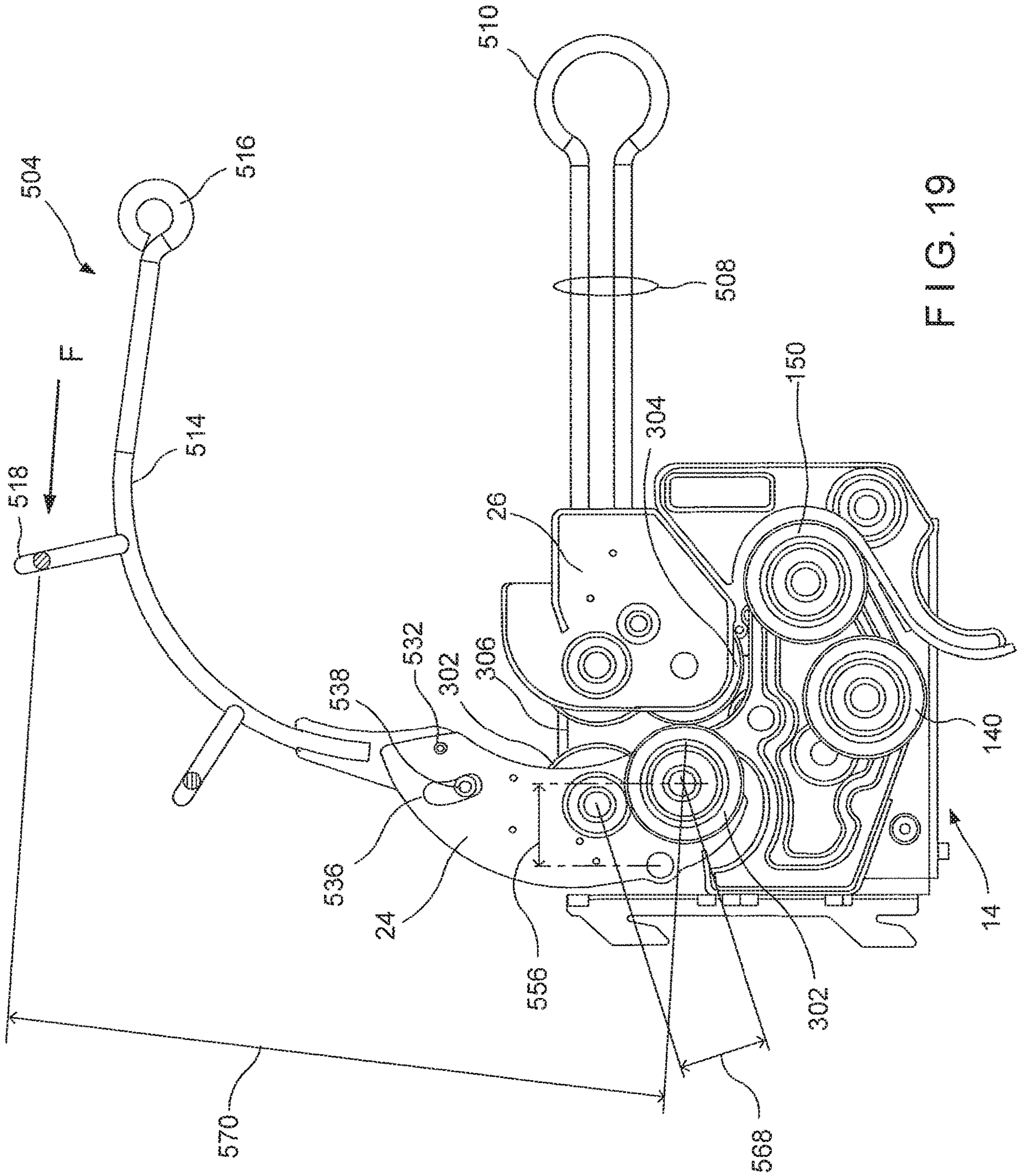
Figure 20:
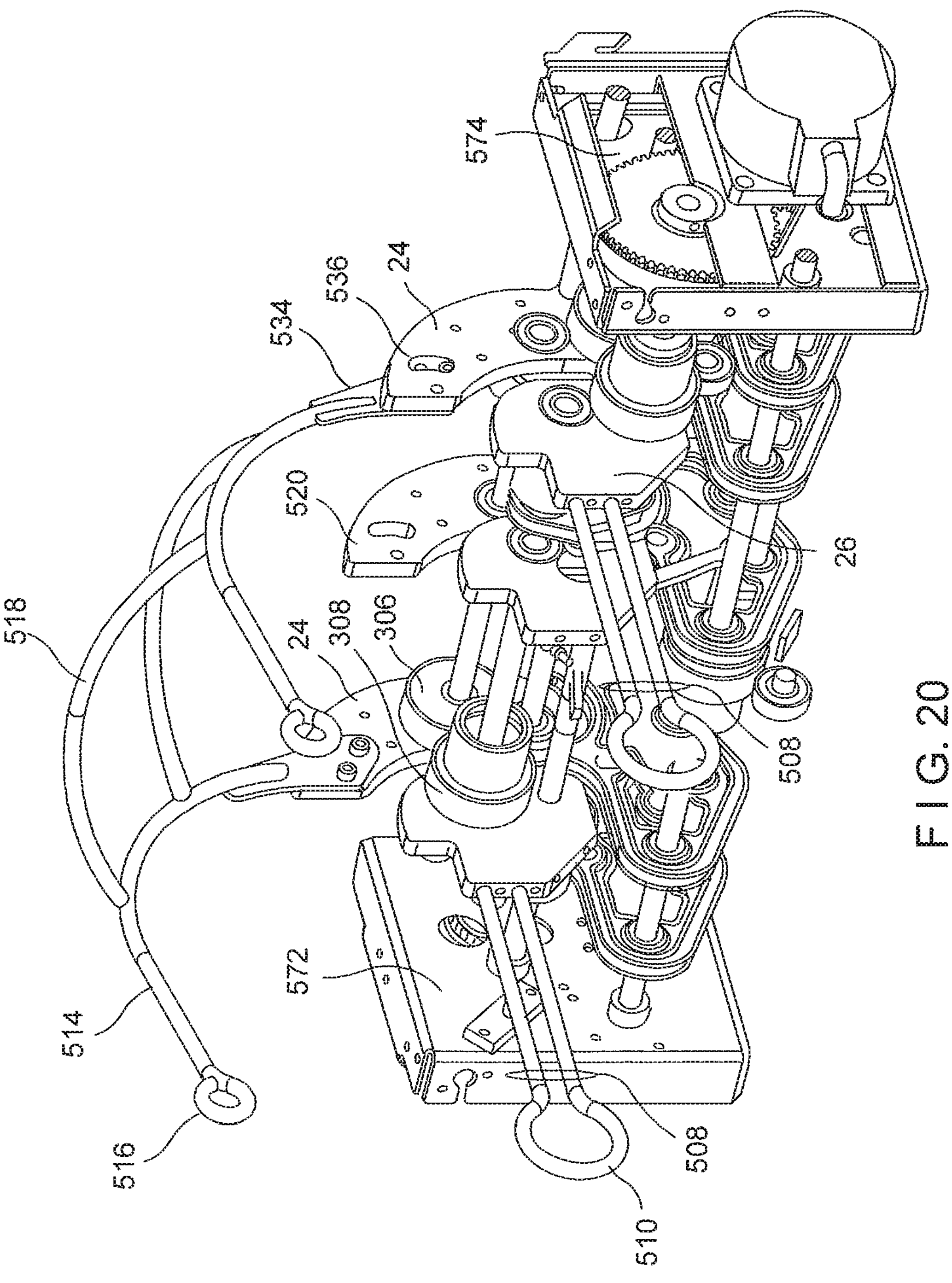

FIG. 9*a* is a side view of the first pivoting guide plate, first fixed guide plate, and associated high-speed roller and low-speed rollers, in accordance with one embodiment;

FIG. 9*b* is an alternate side view of the third pivoting guide plate, third fixed guide plate, and associated low-speed rollers, in accordance with one embodiment;

FIG. 10 illustrates a view of the third pivoting guide plate and associated exit-side rollers with a view of the eccentric assembly between the entry-side rollers and the exit-side rollers FIG. 11 illustrates a cross sectional view of the eccentric assembly of FIG. 10;

FIG. 12 is a perspective view of a pick-up system of a dunnage machine;

FIG. 13 is a side, partial cut-away view of the dunnage system;

FIG. 14 is a perspective view of a box of paper that can be used with a pivoting sheet supply;

FIG. 15 is a perspective view of a portion of the dunnage system of FIG. 1;

FIG. 16 is side view of an upper holding portion of a dunnage handler;

FIG. 17 is a front, cross-sectional view showing a crossbar of a dunnage handler;

FIG. 18 is a side perspective view of a pulley side of a dunnage machine;

FIG. 19 is a side view of a dunnage handler support structure in a released position;

FIG. 20 is a front/side perspective view of a dunnage handler; and

Figure 8:
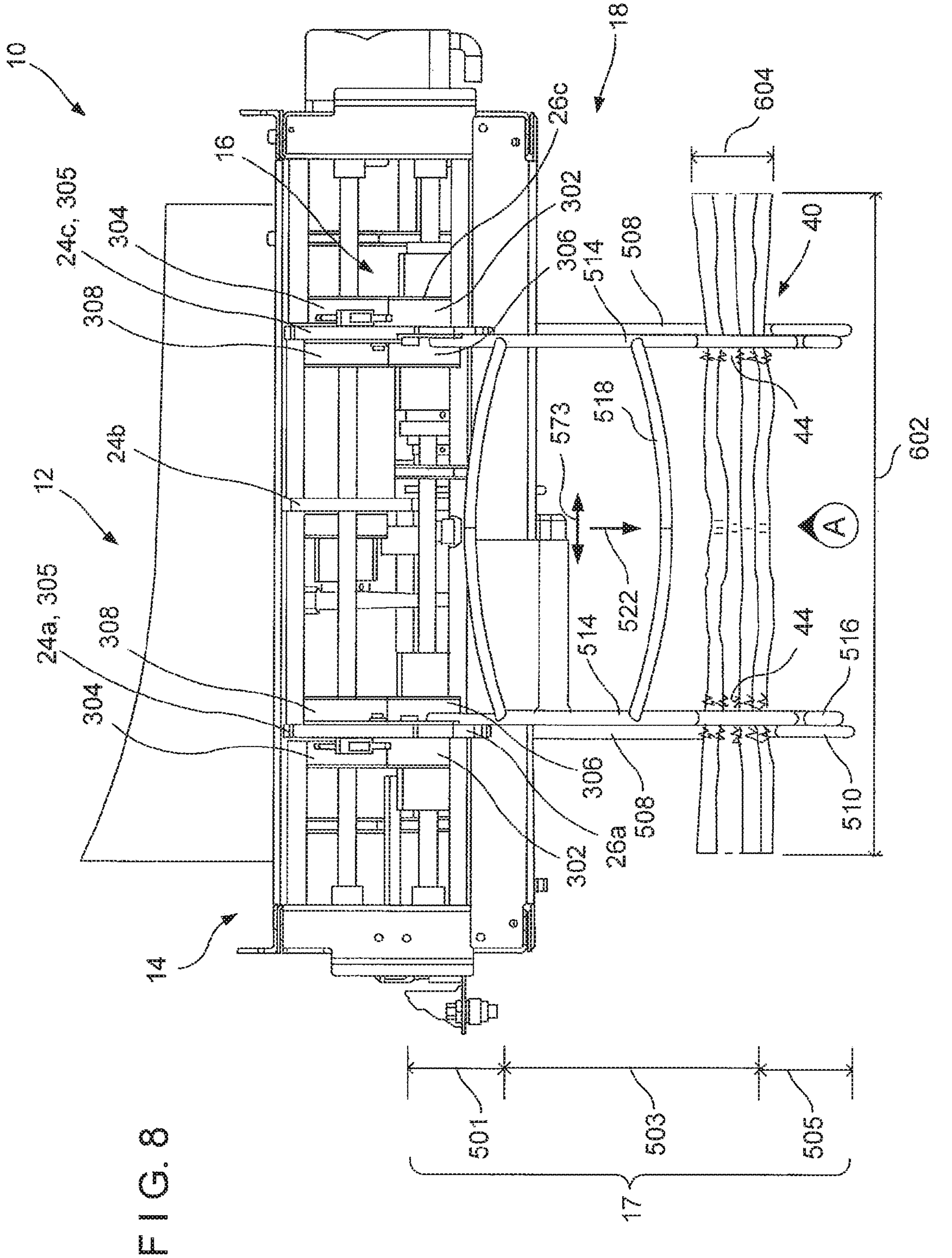
FIG. 8 is a partial, top view of the dunnage system of FIG. 1.
Figure 21:
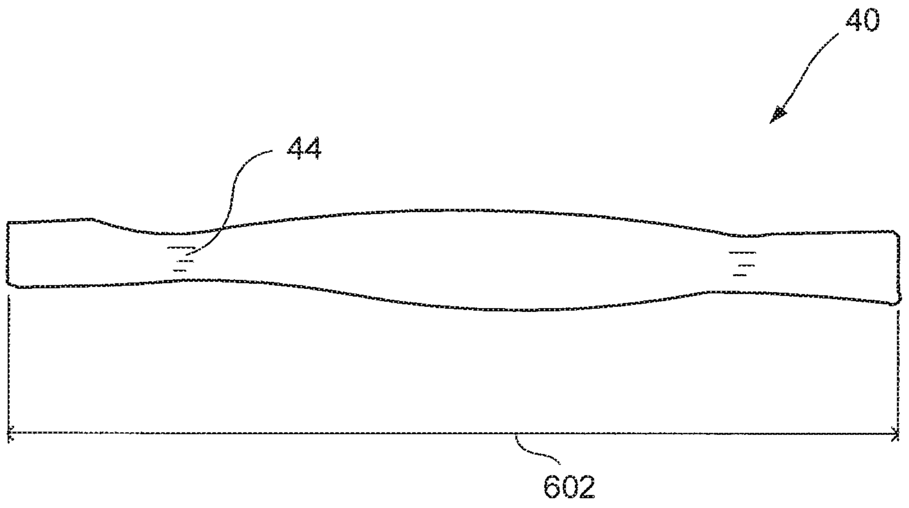

FIG. 21 is a front view 'A,' as shown on FIG. 8, of a unit of dunnage, all in accordance with certain embodiments.

DETAILED DESCRIPTION

The dunnage system provided herein may be used to process sheet material, such as a roll or, preferably, a stack of paper, into dunnage. Commonly, the unprocessed material type may be pulp based virgin and recycled papers, newsprint, cellulose and starch compositions, and poly or synthetic material. The type, thickness, and weight of material may be considerations for the speed of operation. For example, thicker material takes up more space and thus cannot be packed as tightly into the crumpling zone.

Referring to the dunnage system of FIG. 1, the system picks up the unprocessed material from a sheet supply using a pick-up system. This material is fed into the crumpling mechanism for crumpling into dunnage. The system may be used to cross crumpling dunnage. Cross crumpling is intended to refer to crumpling of material in a manner more than mere longitudinal crumpling. More specifically, cross crumpling is intended to refer to crumpling at an angle, such as at least 30°, 60°, 80°, up to 90° to the longitudinal axis. In the preferred crumpling mechanism 16, the material is generally cross crumpled (or compressed) to form dunnage. It is to be appreciated, however, that other aspects of the system may be used with other crumpling mechanisms or to create other types of dunnage. The dunnage is fed from the crumpling mechanism 16, for example into a dunnage handler 18, from which it may be dispensed. The system thus includes an in-feed area 14 where the material is picked up, a crumpling area 16 where the material is processed into dunnage, and a dunnage handler area 18 for controlling an outfeed of dunnage from the crumpling area.

FIG. 1 illustrates a perspective view of a dunnage system 10. As shown, the dunnage system includes a material source 12, a pick-up system 14, a crumpling mechanism 16, and a dunnage handler 18.

The pick-up system 14 functions to pick material up from a supply and to feed the material to the crumpling mechanism 16. The components of the crumpling mechanism 16 are provided interior to the crumpling mechanism 16 and thus are not shown in FIG. 1. The interior component are shown and described in more detail with reference to other figures. The crumpling mechanism includes a plurality of crumpling members that operate to crumple the material, and preferably to cross crumple the material. In certain embodiments, the crumpling members may be rollers. More specifically, the crumpling mechanism feeds unprocessed material from a set of entry-side crumpling members to a set of exit-side crumpling members. In one embodiment, the entry-side crumpling members are high speed rollers and the exit-side crumpling members are low-speed rollers. At least because of the speed difference between the high-speed rollers and the low-speed rollers and/or because of potential lateral offset of the high-speed rollers relative to the low-speed rollers, the material is pleated in a crumpling zone. The entry-side rollers and the exit-side rollers further act to form a crimped region in the pleats, thereby locking the pleats in place.

The dunnage handler may be positioned adjacent to, or may form a portion of, the dunnage machine. Generally, the dunnage handler controls an outfeed of dunnage from the crumpling mechanism. Thus, the dunnage handler may be adapted to accumulate or discharge dunnage received from the outfeed of the crumpling mechanism. The dunnage handler may include a bottom support and a top support each positioned downstream from the crumpling mechanism and on opposing sides of the dunnage stream. In some embodiments, the top and/or bottom support may include a plurality of rails for supporting the dunnage, each having an accumulation feature on a trailing end. As such, the top and bottom rails together may form a cage.

In one embodiment, the top support may be pivotally adapted and the bottom support may be fixed. In this embodiment, the top support may allow for expansion of the space between the top and bottom support to accommodate accumulation of dunnage. In another embodiment, the bottom support may be rotatably disposed to allow it to be rotated between an accumulation position and a discharge position. With the bottom support in the accumulation position, dunnage may be collected by the dunnage handler and packing personnel may retrieve the dunnage by reaching into the dunnage handler, grasping dunnage, and pulling it through the cage. With the bottom support in a discharge position, the dunnage handler may be positioned to discharge dunnage into a container or into or onto a transport device such as a hopper or conveyor.

Figure 2:
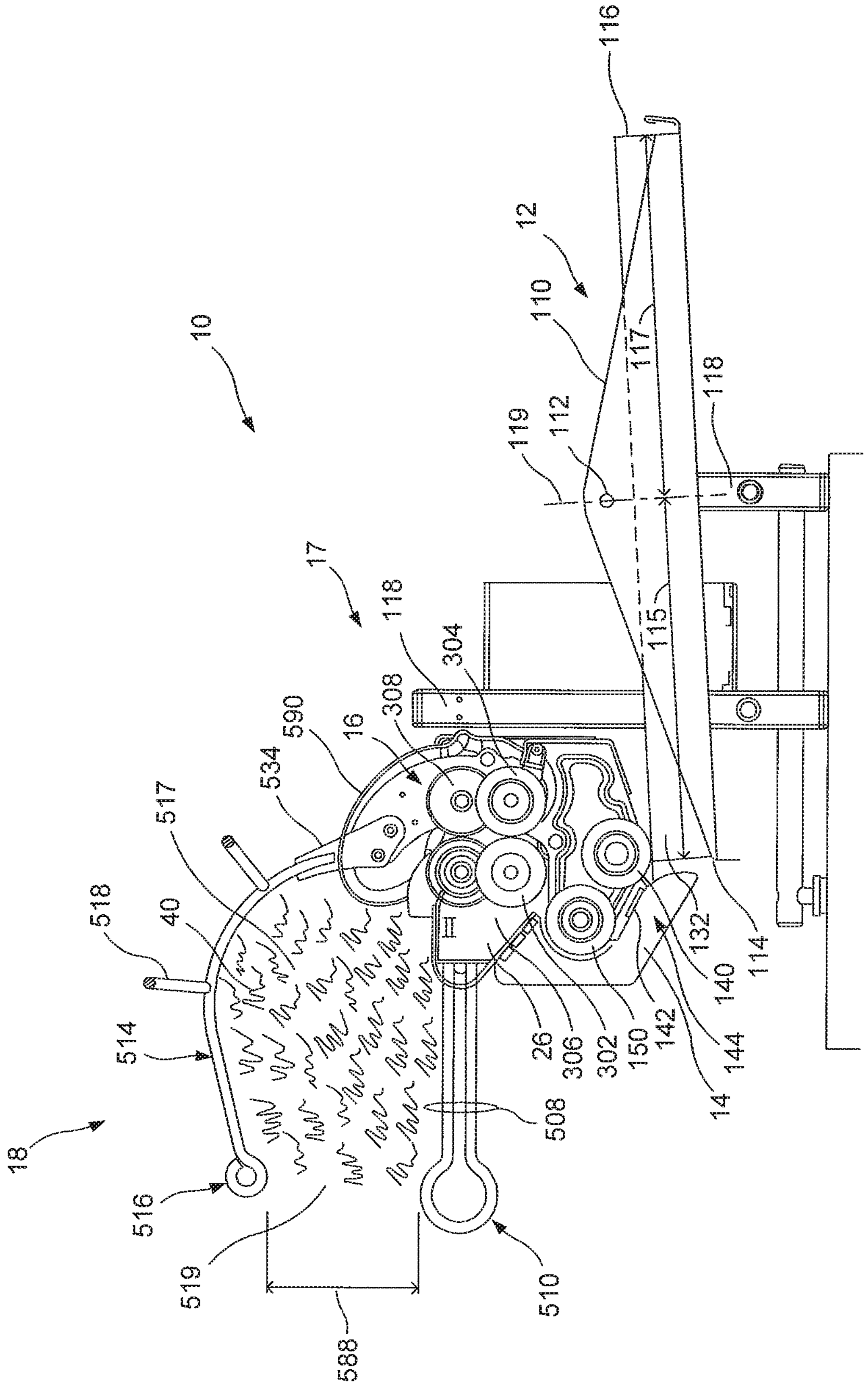
FIG. 2 is a side view thereof, in partial cross-section, with a full dunnage handler.

FIG. 2 illustrates a side view of the dunnage system 10, in accordance with one embodiment. More specifically, FIG. 2 illustrates the dunnage system 10 in further detail and provides an introduction to the workings of the dunnage system. As shown, the material source 12 may comprise a tray. In some embodiments, the tray may be pivotable. The pick-up system 14 draws material from the tray 12 and feeds it to the crumpling mechanism 16. It is to be appreciated that the material may comprise separate sheets of material, may comprise a roll of material that is cut or otherwise separated into smaller units, or may comprise other suitable material configurations. The dunnage system 10 feeds material through the crumpling mechanism 16 in a manner such that it is crumpled by a plurality of crumpling members, such as rollers 302, 304, 306, 308, to form dunnage having a desired configuration. The crumpling mechanism 16 then releases the created dunnage into a dunnage handler 18. The dunnage handler accumulates the dunnage and controls outfeed of the dunnage.

FIG. 2 illustrates further aspects of the dunnage handler 18 that will be described more fully below with reference to other figures.

Figure 3:
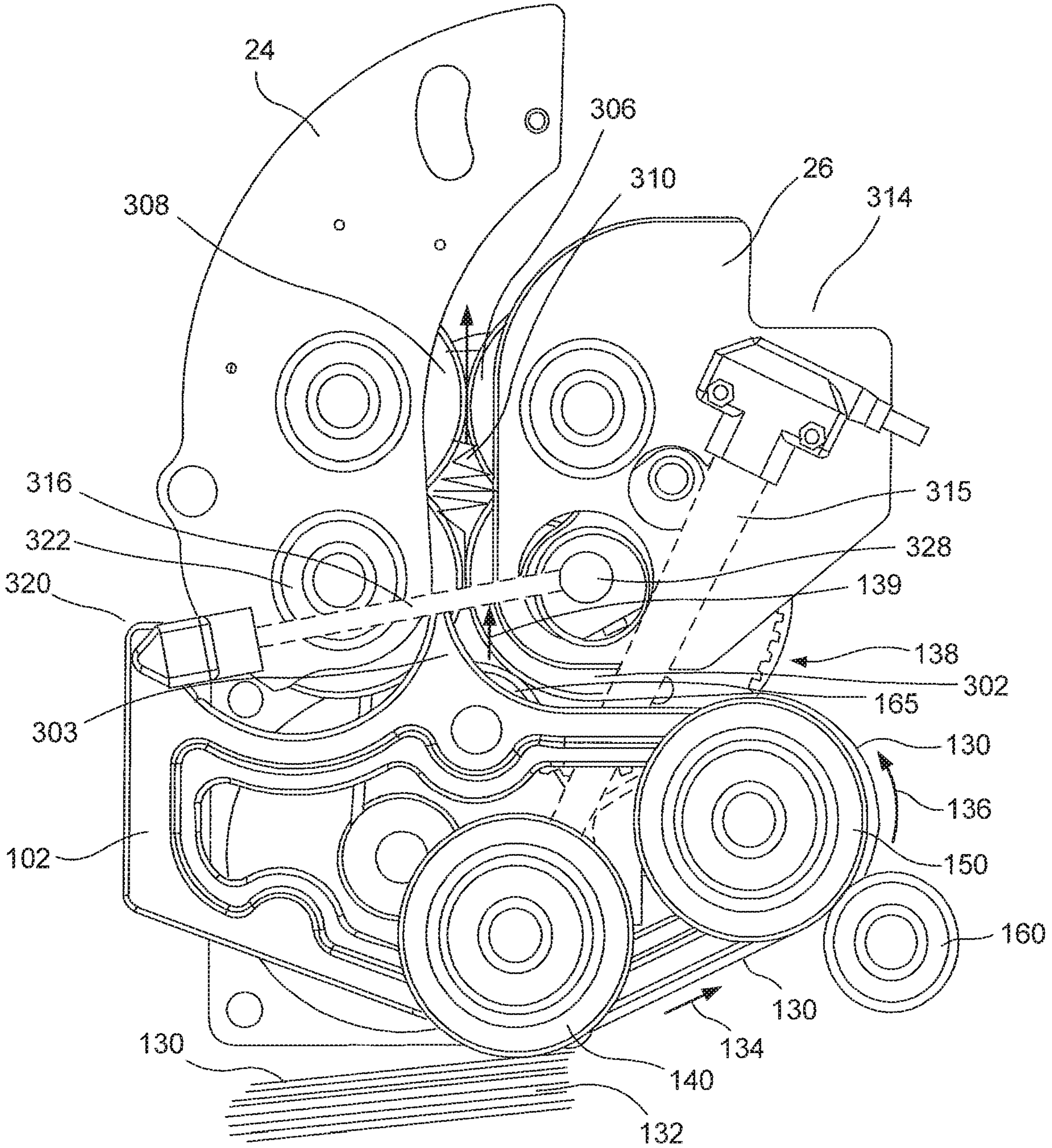
FIG. 3 is a side, cross-sectional view of a dunnage mechanism thereof.

FIG. 3 illustrates a close up view of a crumpling mechanism 16 of a dunnage system, in accordance with one embodiment. The crumpling mechanism 16 includes a plurality of crumpling members 302, 304, 306, 308 that together define a crumpling zone 310 therebetween when viewed laterally with respect to the feed path through the crumpling members and crumpling zone. The crumpling members 302, 304, 306, 308 may be supported by member supports 24 or 26. The crumpling members 302, 304, 306, 308, their lateral orientation to one another, and their relative speeds and movement cause the material to be formed into dunnage. In a specific embodiment, the crumpling members include two exit-side rollers 306, 308 and two entry-side rollers 302, 304 The exit-side rollers 306, 308 may be referred to as low-speed rollers 306, 308 in the preferred embodiment since in this embodiment their linear speed is less than that of the other two crumpling members. Alternatively, the exit-side rollers 306, 308 may be to as upper rollers in the preferred embodiment since in this embodiment they are disposed vertically above the crumple zone 310 and the high-speed rollers 302, 304. The entry-side rollers 302, 304 may be referred to as high-speed rollers 302, 304 in the preferred embodiment since in this embodiment their linear speed is more than that of the other two crumpling members. Alternatively, the entry-side rollers 302, 304 may be referred to as lower rollers in the preferred embodiment since in this embodiment they are disposed vertically below the crumple zone 310 and the low-speed rollers 306, 308).

The first and second entry-side crumpling rollers 302, 304 define an entry therebetween while the first and second exit-side crumpling rollers 306, 308 define an exit therebetween. The first entry-side crumpling roller may be configured for moving at an first rate and may be associated with the second entry-side crumpling roller for moving sheet material through the entry in a first direction along a longitudinal path at an entry rate. The exit is disposed along the longitudinal path downstream of the entry in the first direction. The first exit-side crumpling roller may be configured for moving at a second rate and may be associated with the second exit-side crumpling roller for moving the sheet material through the exit in the first direction along the longitudinal rate at an exit rate that is slower than the entry rate to crumple the sheet material for producing dunnage.

A crumpling zone 310 is defined between the entry and the exit. It is generally within this crumpling zone 310 that the material is processed from raw material to dunnage. The entry-side crumpling rollers 302, 304 and the exit-side crumpling rollers 306, 308 may be displaced laterally along the path with respect to each other to cause shearing of the material within the crumpling zone. More specifically, the entry-side crumpling rollers 302, 304 and the exit-side crumpling rollers 306, 308 may be displaced laterally such that the shearing creates crumpling along axes at a non-orthogonal angle with respect to the longitudinal path. Such non-orthogonal angle may be any angle less than 91°. The exit-side crumpling rollers 306, 308 may be provided generally interior of the dunnage system while the entry-side crumpling rollers 302, 304 may be provided generally exterior of the dunnage system (shown in FIG. 4).

It is to be appreciated that relative spatial orientations may vary in different orientations and/or configurations. In some embodiments, all of the low-speed rollers 306, 308 and the high-speed rollers 302, 304 have the same diameter.

FIG. 3 further illustrates portions of the in-feed system cooperatively associated with the crumpling members for feeding a subsequent sheet of the material along an infeed-path to the entry of the crumpling zone formed by the entry-side rollers. In the embodiment shown, the in-feed system comprises a pick up roller 140 and a transfer roller 150. The pick up roller 140 for picks material up from the material source (for example, a tray) and feeds the material along a pick up path towards the in feed path. The transfer roller 150 the sheet of material from the pick up path to the in feed path. While this is a specific configuration of an in-feed system that may be used to feed unprocessed material into the crumpling mechanism 16, it is to be appreciated that any system for feeding unprocessed material into the crumpling mechanism may be used. In the embodiments shown, unprocessed material is provided as a stack of sheets in a tray. The stack of sheets is picked up by the pick up roller 140, fed through a transfer roller 150 and pinch bearing and guided into the crumpling mechanism 16.

As shown, a stage eye 314 may be provided for determining when the in-feed path, or path from the transfer roller 150 to the crumpling mechanism 16, is clear. The optical path 315 of the stage eye 314 is shown in dashed lines. It is to be appreciated that this path is not a structural element of the figure. A reflective element may be provided on the pick up roller 140 or on the pick up roller shaft 30 such that the reflective element reflects light back to the stage eye 314 when the optical path 315 from the stage eye 314 is not obstructed by material. In some embodiments, the reflective element may be a reflective sticker. The reflective element is provided generally in line with the stage eye 314. The stage eye facilitates maintenance of steady state production. While optical sensing is herein described, mechanical or alternative sensing methods may alternatively be used.

A path clear eye 320 may be provided for determining when an end of the preceding sheet of processed material has passed through the high-speed rollers 302, 304. A reflective element thus may be provided on the fixed guide plate high-speed roller 302 or the fixed guide plate high-speed roller shaft 328 such that the reflective element reflects light back to the path clear eye 320 when the optical path 322 from the path clear eye 320 is not obstructed by material. The path clear eye reduces the possibility of inadvertent jamming that may occur. While optical sensing is herein described, mechanical or alternative sensing methods may alternatively be used.

The in-feed system may be configured such that a sheet of material is picked up and fed towards the crumpling mechanism only when the stage eye 314 and the path clear eye 320 are clear. Thus, the subsequent sheet of material is fed when the preceding sheet is in the crumpling zone but passed the path clear eye 320.

The transfer roller 150 feeds material into the crumpling mechanism 16. In some embodiments, a guide may be provided with the transfer roller 150 for more effectively guiding the material to the crumpling mechanism 16. The unprocessed material is fed into the crumpling mechanism 16 between the two high-speed rollers 302, 304. An entry-guide 305 may be provided along the in-feed path to assist in guiding the material into the entry formed by the entry-side rollers 302, 304. In a preferred embodiment, the entry-guide 305 is offset from the entry and is spaced from the entry-side roller 302 by the thickness being used to guide the material. This spacing places the material in the proper position for feeding into the entry. The unprocessed material then enters the crumpling zone 310. The processed material, or dunnage, exits the crumpling zone 310 through the two low-speed rollers 306, 308. At least because the exit-side rollers 306, 308 operate at a lower speed than the entry-side rollers 302, 304, the material crumples in the crumpling zone 310. Thus, the two low-speed rollers 306, 308 and the two high-speed rollers 302, 304 work together to create a crumpling zone 310.

FIG. 3 illustrates example positioning of the end of a preceding sheet of processed material and the beginning of a next sheet of unprocessed material as the unprocessed material is fed from the pick-up system into the crumpling mechanism 16. In use, the dunnage system 10 may be set such that a subsequent sheet of unprocessed material is fed into the crumpling zone at a specific position of the trailing edge of the preceding sheet of material. As discussed above, the path clear eye 320 may determine when the end of the preceding material has passed through the entry-side rollers 302, 304. This can prompt infeeding of another sheet of material.

Speed of crumpling rollers 302, 304, 306, 308 refers to the surface speed or linear speed of the rollers. Generally, the exit-side (or upper) rollers 306, 308 move slower than the entry-side (or lower) rollers 302, 304. In embodiments in which the diameter of the exit-side rollers 306, 308 and the entry-side rollers 302, 304 is the same, to achieve a faster speed, the entry-side rollers 302, 304 rotate at a higher velocity than the exit-side rollers 306, 308. In other embodiments, the diameter of the exit-side rollers 306, 308 may be larger than the diameter of the entry-side rollers 302, 304 such that, at the same velocity of rotation, the entry-side rollers 302, 304 have a higher linear speed than the exit-side rollers 306, 308. The speed and relative orientation of the rollers 302, 304, 306, 308 together facilitate compression or crumpling of the unprocessed material into dunnage. More specifically, the crumpling mechanism 16 creates dunnage having a configuration including pleats and crimped regions.

Figure 4:
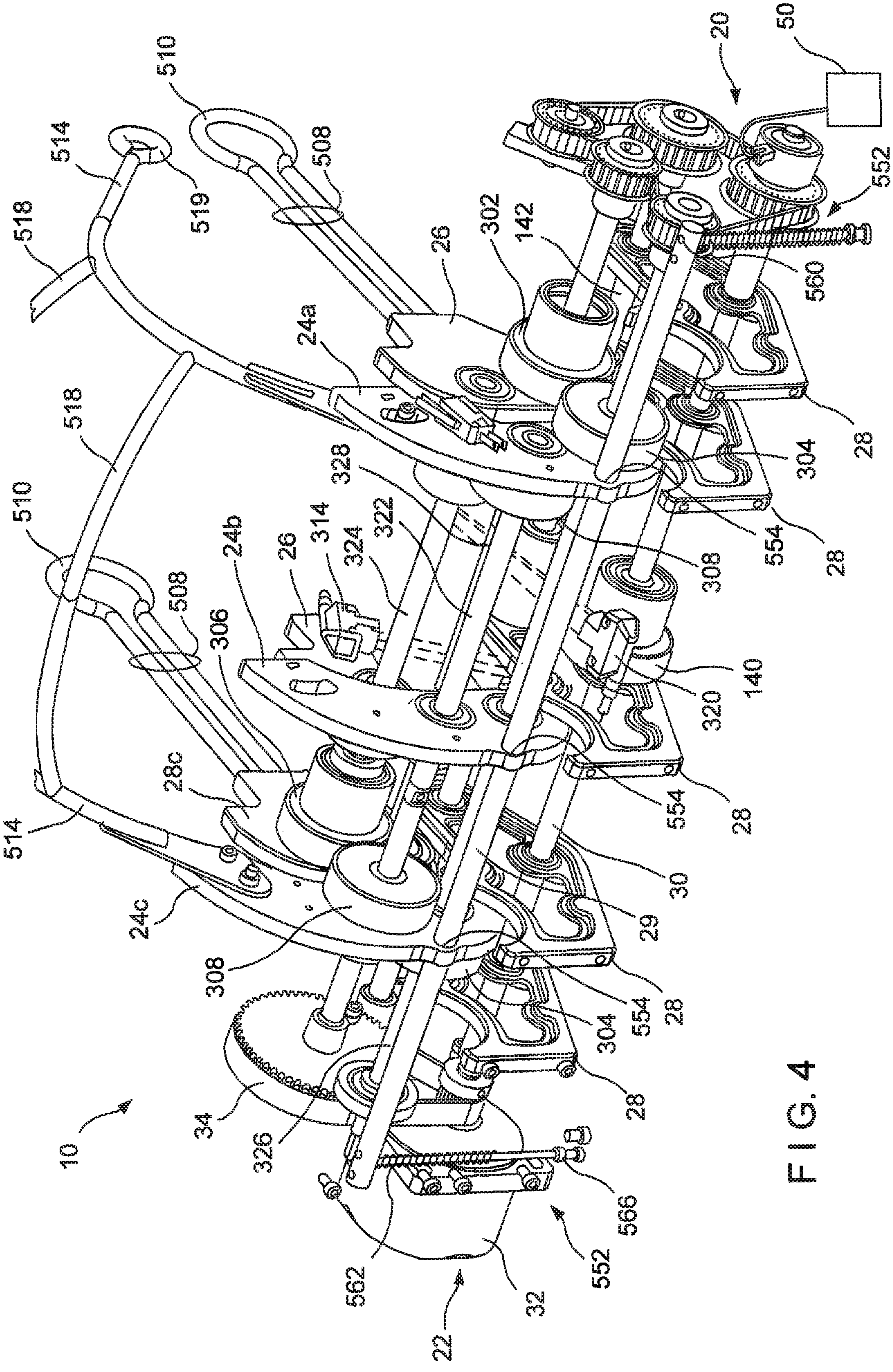
FIG. 4 is a rear, perspective view of the dunnage mechanism and handler thereof.

FIG. 4 illustrates the dunnage system 10 from a rear perspective. The dunnage system 10 includes a pulley end 20 and a motor end 22. As shown, The dunnage system may include a first set of entry and exit crumpling rollers near the pulley end 20 and a second set of entry and exit crumpling rollers near the motor end 22. The material thus extends between the first set of entry and exit crumpling rollers and the second set of entry and exit crumpling rollers and is crumpled generally proximate ends of the material that pass through the respective sets of rollers. In some embodiments, a further crumpling roller, which in the preferred embodiment is a center roller 312 (shown in FIG. 8), may be provided. The center roller may be provided at any lateral location between the first set of entry and exit side crumpling rollers and the second set of entry and exit side crumpling rollers. In some embodiments, the center roller is approximately central to the first and second sets of entry and exit side crumpling rollers. The center roller may be provided along a shaft supporting the first or the second high speed rollers, discussed more fully below. The center roller thus may be provided at a generally low location and may operate at a high speed. In use, the center roller operates to push the material along the longitudinal path. In embodiments where the exit-side crumpling rollers are provided interior of the dunnage system, the center roller may assist in pushing the material upwardly on each side against the exit-side crumpling rollers. More specifically, because the entry-side rollers are positioned laterally outside with respect to the exit-side rollers, a sheet of material is pushed up at the sides and down closer to the center (relatively speaking since the inner, upper rollers are slower and thus restrict the upward movement). The center roller pushes up so that there is an upward push on each lateral side of the exit-side rollers, helping the sheet of material move along and improving the creasing. In further embodiments, two center rollers may be provided and may be oriented generally in the same manner as the first and second entry-side rollers.

As shown, the dunnage system includes support structures. Suitable support structures can include, for example, a base, a plate, a bracket, or a mounting surface. Other suitable support structures can be provided. As shown, in FIG. 4, the support structures may be guide plates. In a specific embodiment, the support structures include pivoting guide plates and fixed guide plates. More specifically, in the embodiment shown, the support structures include first, second, and third pivoting guide plates 24*a*-24*c* (referred to collectively as pivoting guide plates 24) and first, second, and third fixed guide plates 26*a*-26*c* (referred to collectively as fixed guide plates 26). The pivoting guide plates 24 span from the crumpling mechanism 16 to the dunnage handler 18. The first pivoting guide plate 24*a* is provided generally near the pulley side 20 of the dunnage system 10, the third pivoting guide plate 24*c* is provided generally near the motor side 22 of the dunnage system 10, and the second pivoting guide plate 24*b* is provided intermediate the first pivoting guide plate 24*a* and the third pivoting guide plate 24*c*. A pivoting guide plate coupling shaft 29 is provided coupling the pivoting guide plates 24. Fixed guide plates 26*a*-26*c* are provided coupled to each of the pivoting guide plates 24*a*-24*c*. In some embodiments, a second fixed guide plate 26*b* (for coupling to the second pivoting guide plate 24*b*) may not be provided. A plurality of frames 28 may be provided for supporting the crumpling mechanism 16 and the dunnage handler 18. In the embodiment shown, five frames 28 are provided with three of the frames 28 being associated with the pivoting guide plates 24 (one frame per pivoting guide plate 24).

A pick up roller 140 is provided generally centrally of the pulley end 20 and the motor end 22. The pick up roller 140 works with a transfer roller 150 to move unprocessed material from the material source to the crumpling mechanism 16. A pick up roller shaft 30 is provided through the pick up roller 140 and, in this embodiment, through the frames. The pick up roller shaft 30 is driven by an electromechanical clutch on the pulley end of the dunnage system and in turn drives the pick up roller 140.

As discussed, in the embodiment shown, the crumpling mechanism 16 of the dunnage system 10 includes two sets of exit-side rollers 306, 308 and two sets of entry-side rollers 302, 304. Each set of exit-side rollers includes a pivoting guide plate exit-side roller 308 (coupled to a respective pivoting guide plate 24) and a fixed guide plate exit-side roller 306 (provided proximate or coupled to a respective fixed guide plate 26). Each set of entry-side rollers includes a pivoting guide plate entry-side roller 304 (provided proximate or coupled to a respective pivoting guide plate 24) and a fixed guide plate entry-side roller 302 (provided proximate or coupled to a respective fixed guide plate 26).

Accordingly, the first set of entry-side rollers 302, 304 and the first set of exit-side rollers 306, 308 are provided proximate the first pivoting guide plate 24*a*, with a first pivoting guide plate exit-side roller 308 being coupled to the first pivoting guide plate 24*a*. The second set of entry-side rollers 302, 304 and the second set of exit-side rollers 306, 308 are provided proximate the third pivoting guide plate 24*c*, with a second pivoting guide plate exit-side roller 308 being coupled to the third pivoting guide plate 24*c*. In other embodiments, where more creasing of pleats in the dunnage (described below) is desired, further sets of entry-side rollers and exit-side rollers may be provided.

A pivoting guide plate low-speed roller shaft 322 is provided coupling the pivoting guide plate exit-side rollers 308. A fixed guide plate low-speed roller shaft 324 is provided coupling the fixed guide plate exit-side rollers 306. A pivoting guide plate high-speed roller shaft 326 is provided coupling the pivoting guide plate entry-side rollers 304. A fixed guide plate high-speed roller shaft 328 is provided coupling the fixed guide plate entry-side rollers 302. The optional center roller may be provided on one of the pivoting guide plate high-speed roller shaft 326 or the fixed guide plate high-speed roller shaft 328. In the embodiment shown, the center roller is provided on the fixed guide plate high speed roller shaft 328. The shafts 322, 324, 326, 328 assist in communicating movement to the rollers 308, 306, 304, 302.

A motor 32 is provided in a suitable location for driving the dunnage mechanism 16, and preferably also the intake mechanism 14. The motor is preferably provided on the motor side 22 of the dunnage system 10 for driving various components of the dunnage system 10. The motor 32 is coupled to the fixed guide plate high-speed roller shaft 328 and thus drives the fixed guide shaft high-speed rollers 304. A pulley 34, or other transmission, is provided for communicating power from the motor 32 to the fixed guide plate low-speed roller shaft 324. Accordingly, the motor 32 powers the pulley 34 which in turn powers the fixed guide speed roller shaft 324 to rotate the fixed guide shaft low-speed rollers 306.

In the preferred embodiment, an electromechanical clutch 36 is provided on the pulley end 20 of the dunnage system 10 for driving various components of the dunnage system 10. The electromechanical clutch 36 drives the pick up roller shaft 30, which in turn drives the pick up roller 140. A belt drives the pulley along the pick-up roller shaft 30. The electromechanical clutch 36 has an electroconnector that is associated with an adaptive control system 50 or controller. The controller 50 indicates to the clutch when to engage the pick-up roller shaft 30 and when to disengage the pick-up roller shaft 30. When the pick-up roller shaft 30 is disengaged, the pulley may rotate but it will not rotate the pick-up roller shaft 30. The controller 50 indicates information to the clutch based on data from the stage eye and the path-clear eye. When the stage eye and the path-clear eye are clear, the controller 50 indicates to the electromechanical clutch 36 to engage the pick-up roller shaft 30. In some embodiments, the system may have a variable speed to reduce starting and stopping of the system.

In alternative embodiments, no electromechanical clutch may be provided and the dunnage system may be driven in a timed manner. For example, the dunnage system may engage the pick-up roller shaft on a timed basis such as by engaging the pick-up roller shaft every 15 seconds.

Thus, in a preferred embodiment, an adaptive control system 50 or controller may be provided to coordinate the timing of the ingress of the subsequent sheet to the crumpling zone with the egress of the preceding sheet from the crumpling zone to facilitate steady state operation of the dunnage system. It is to be appreciated that FIG. 4 illustrates a schematic control system 50 and any suitable control system may be used for reading data from the stage eye 314 and the path clear eye 320 and communicating directions to the motor 32 and the electromechanical clutch 36. For example, the control system 50 may be set such that the electromechanical clutch 36 is operated, and thus in-feed actuated, when both the stage eye 314 and the path clear eye 320 are clear. Generally, the next sheet of paper is fed into the crumpling zone when the preceding sheet is at a certain level in the crumpling zone. That is done by engaging and disengaging the electromechanical clutch on the pick up wheel. The precise timing of engagement and disengagement may be based on the length of the in feed path, the speed of the transfer rollers, and the speed of the crumpling rollers.

Figure 5:
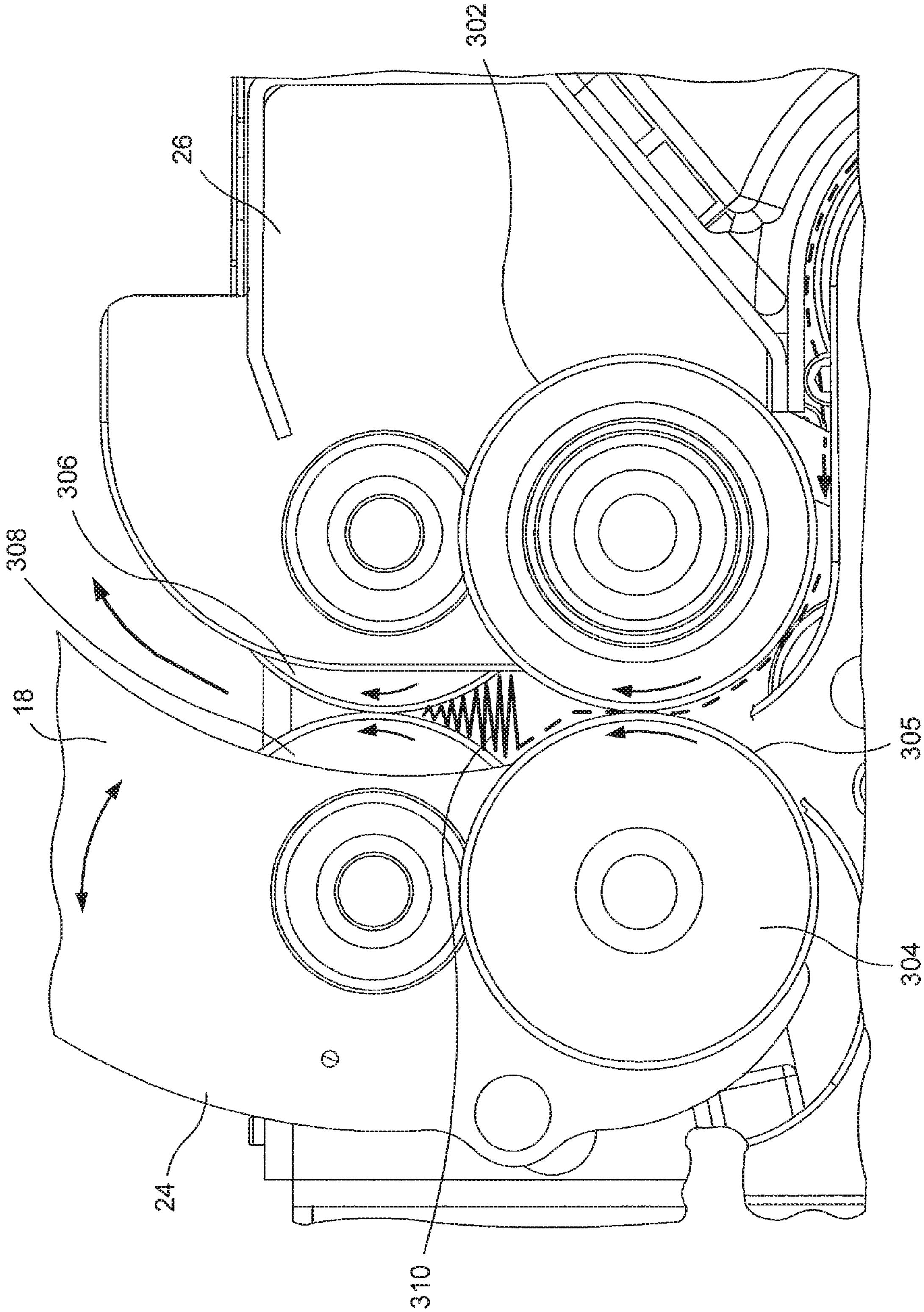
FIG. 5 is a close-up view of the crumpling mechanism 16 of the dunnage mechanism of FIG. 4.

FIG. 5 illustrates another close up view of the crumpling mechanism 16, in accordance with one embodiment. The lateral spacing of the entry-side rollers 302, 304 and the exit-side rollers 306, 308 is set in the present embodiment by the width of the guide plates, and is measured laterally with respect to the path between the entry-side roller 304 and the exit-side roller 308 on each guide plate. Thus, as can be seen in the figure, the entry-side rollers 302, 304 are provided on one side of the guide plates 24, 26 (the outboard side) and the exit-side rollers 306, 308 are provided on the other side of the guide plates 24, 26 (the inboard side). Because the entry-side rollers 302, 304 and exit-side rollers 306, 308 are laterally spaced from one another, they may overlap longitudinally. This in turn permits use of larger rollers. Larger rollers may have higher linear speed. The longitudinal spacing of the rollers is measured along the path and is determined along the shape of the crumpling zone.

The lateral spacing 309 (shown in FIG. 8) of the rollers may be selected based on the unprocessed stock material that is to be used. In various embodiments, the lateral separation of rollers may range between approximately 2 mm and approximately 20 mm depending on the unprocessed material properties. In one embodiment, where width between 289.5 mm, the lateral spacing 309 is 9.5 mm. Generally, if the rollers are positioned too close together, the unprocessed material may be torn when forced between the rollers. Conversely, if the rollers are positioned too far apart, the crimped area may not lock in the pleats when the unprocessed material is forced between the rollers. The lateral spacing 309 is preferably selected to control the shearing within the crumple zone 310. Typically, the closer the lateral spacing 209 is, the more shearing there will be in the material passing through the crumple zone 310 since this is the region that is deformed to accommodate the different speeds at which the material is moved through the entry-side rollers 302, 304 and the exit-side rollers 306, 308. Higher shearing in the crumple zone has been found to increase the crimping in the crimped regions, more tightly locking in the folds in the central region of the formed dunnage. The lateral spacing is preferably sufficiently large to prevent tearing of the stock material, but sufficiently small to provide a high degree of creasing in the crimped region.

The longitudinal spacing of the rollers may be selected such that the exit-side rollers overlap the entry-side rollers. More specifically, as shown, the axes of the exit-side rollers and the axes of the entry-side rollers are positioned closer together than the radii of the exit-side rollers and the entry-side rollers.

The spacing of the entry-side rollers with respect to one another, the spacing of the exit-side rollers with respect to one another, and the spacing of the entry-side rollers with respect to the exit-side rollers determines the size and shape of the crumpling zone. The relative spacing and size of the rollers further determine the path through which the material is fed. It is to be appreciated that the paper is fed from the in-take area by the in-take roller 140, around the transfer roller 150, and to the entry-side rollers 302, 304. More specifically, in the embodiment shown, the paper is fed around the forward entry-side roller 302. As discussed, an entry-guide 305 may be provided to facilitate feeding of the paper into the entry formed by the entry-side rollers 302, 304.

Figure 6:
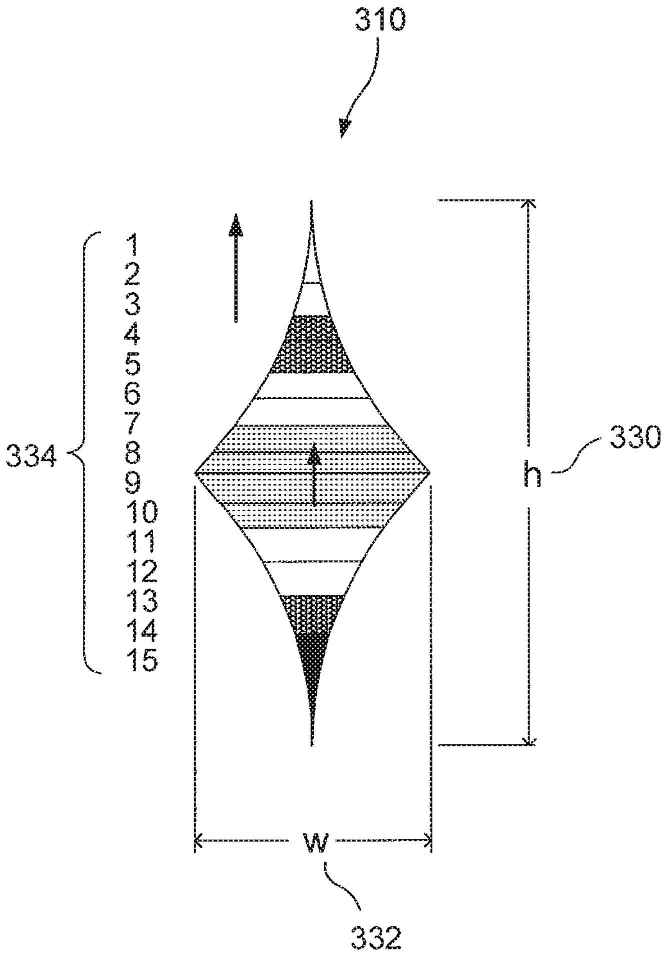
FIG. 6 is an illustration of a crumpling zone thereof.

Referring to FIG. 6, in various embodiments, the crumpling zone 310 may be generally diamond-shaped. In a specific embodiment, the crumpling zone may have a height 330 of approximately 20-60 mm, and more preferably around 40 mm, and a width 332 of approximately 10-30 mm, and more preferably 15 or 16 mm. In one embodiment, the cross-sectional area, viewed from a lateral direction orthogonally to the path through the entry-side rollers, crumpling zone, and exit-side rollers, of approximately 200 sq. mm. In one embodiment, the crumpling zone 310 has a height 330 of 1.0 inches and a width of 0.5 inches.

FIG. 6 shows the crumpling zone 310 divided into a plurality of sections 334. The controller 50, or another suitable element of the device, can be set to operate the crumpling mechanism to time subsequent sheets entering the crumpling zone 310 to obtain high reliability and optimal crumpling. In one embodiment, the controller 50 is configured to operate the infeed and crumpling mechanisms 14, 16 to move a subsequent sheet of material into the crumpling zone 310 when the preceding sheet of material is at a predetermined location in the crumpling zone 310, or alternatively when the preceding sheet has entirely exited the crumpling zone 310. Preferably, the controller 50 is configured to move the leading edge of a subsequent sheet of material into crumpling zone 310 when the trailing edge of a preceding sheet of material is disposed at a selected section within the crumpling zone 310.

The crumpling zone may be considered as having 3 sub-zones. The first sub-zone is the entry-zone, where the material enters the crumpling zone. The second sub-zone is the fill-zone. The fill-zone is the area where, when the trailing edge of the preceding sheet of the material enters, it is ideal for the leading edge of the subsequent sheet to enter the entry-zone. The third sub-zone is the exit-zone, where the material enters the crumpling zone. In the embodiment shown, the crumpling zone has been divided into 15 sections 334 starting at section 15 where the material enters the crumpling zone 310 (between the high-speed rollers) and ending at section 1 where the material exits the crumpling zone (between the low-speed rollers) to the dunnage handler. Sections 15-11 comprise the entry-zone, sections 6-10 comprise the fill-zone, and sections 5-1 comprise the exit-zone. Generally, the sections of the fill-zone have a greater area per unit height.

As the time interval between sheets (preceding processed material to subsequent unprocessed material) decreases the ratio of velocities (between the entry-side rollers and the exit-side rollers) may be increased to reduce the likelihood of the crumpling zone filling too quickly. Generally, the time interval for a given ratio may be such that dunnage pitch is approximately equal to the maximum width of the crumpling zone. It was found that if only half of the crumpling zone sections (sections 1-8 in the embodiment shown) are full, the utilized area of the crumpling zone has a positive rate of change. If the time interval decreases, the crumpling zone sections operating (sections 8 or higher in the embodiment shown) have a negative rate of change and there is a propensity to jam. Thus, the ingress of the next sheet may be regulated to maintain the level at a relatively constant state. In some operational parameters, for example where the time duration is too high, the packing of the crumpling zone may be insufficient for effective packing to maintain the desired crimped region pattern. Similarly, the first sheet in any given processing generally has significantly less crumpling.

The size of the crumpling zone 310 may be varied for producing variations of pleat dimensions and characteristics in the produced dunnage. For example, the size and shape of the crumpling zone 310 may be changed for alternate material characteristics or basis weights. In one embodiment, the crumpling zone 310 may be varied by truncating one or more sections (for example from section 6 to section 11) with one or more guide plates. Generally, the support structures may be used to help control the shape of the crumpling zone 310. In a preferred embodiment, the roller supports are positioned between the entry-side rollers and the exit-side rollers and narrow the space where the rollers begin to overlap (near the center of the crumpling zone).

In some embodiments, the subsequent sheet is fed into the crumpling zone when the trailing edge of the preceding sheet is in one of section 7-10 (depending on the material characteristics). Generally, a subsequent sheet of unprocessed material may be fed into the crumpling zone 310 before the previous sheet of material exits the crumpling zone. The subsequent sheet of material aids in the crumpling of the preceding sheet of material due to the subsequent sheet compressing the preceding sheet in the crumpling zone 310. More specifically, the subsequent sheet of material thus assists in compressing the preceding sheet into the smaller profile of the upper sections of the crumpling zone 310.

The crumpling zone 310 is described and oriented in a vertical orientation with flow being from the bottom (section 15) to top (section 1). In other embodiments, the longitudinal orientation and direction of flow may be varied. This embodiment further describes material following an approximately straight line. In alternative embodiments, the material may follow an arc path, an S-shaped path, or other generally non-linear path. In yet further embodiments, a created dunnage product be fed to a further crumpling-zone to progressively form pleats in the material.

Figure 7:
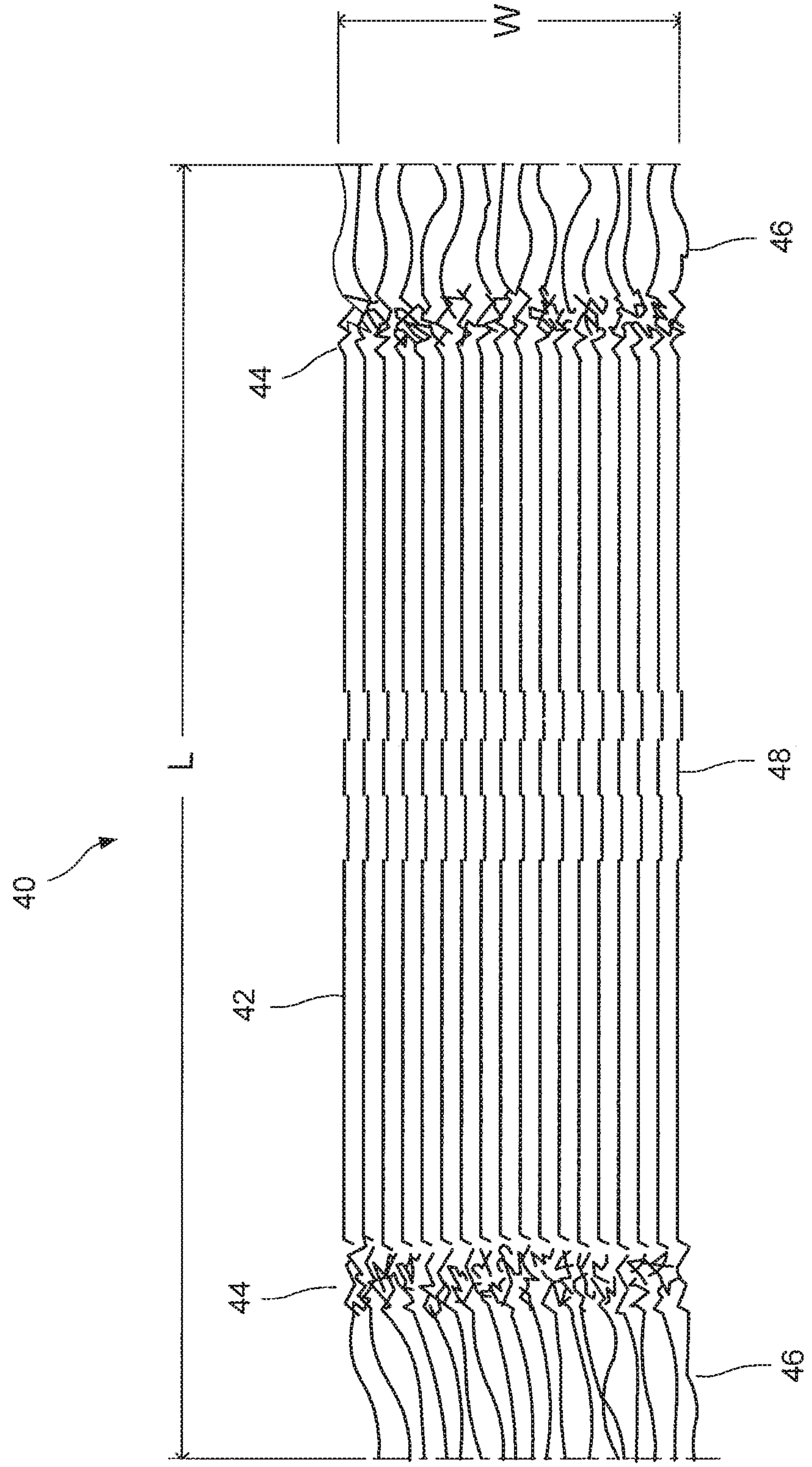
FIG. 7 illustrates dunnage produced by the dunnage system of FIG. 1.

FIG. 7 illustrates a unit of dunnage 40 created using the dunnage system, in accordance with one embodiment. FIG. 8 illustrates movement of the material through the dunnage system with the resultant dunnage 40. The cross-crumpled dunnage 40 can be a relatively elongate crumpled sheet of paper formed from an individual sheet of preprocessed paper. That is, the dunnage 40 may be formed from sheet stock in lieu of, for example, a roll. The crumpled nature of the paper can be such that the paper is repeatedly folded back and forth in an accordion type fashion. In some embodiments, the cross-crumpled dunnage may have a long dimension 602 that is equal to or slightly less than equal to the same dimension in its pre-processed condition. In some embodiments, the short dimension 604 may be between approximately 15% and approximately 25% of its preprocessed length. The height of the accordion folds of the dunnage may range from approximately 0.5 inches to 2 inches from valley to crest. In a preferred embodiment, the height may be approximately 0.75".

As shown, the processed material, or dunnage 40, includes a central area comprising a tight set of common folds 42 that are locked into place with a crimped region 44 on either end thereof. The dunnage 40 includes end areas 46 laterally outside of the crimped region 44. The end areas 46 may comprise folds generally similar to the common folds of the central area but having a more relaxed configuration at least because they have a free side of the sheet. In some embodiments, a center crimped region 48 may be provided.

The central area includes large, mostly parallel folds 42. The offset of the entry-side rollers to the exit-side roller creates shearing at the crimped regions 44, 48. The crumpling in these regions thus is not purely along the longitudinal axis. The higher the shearing, the smaller the spacing between folds. The peaks of the folds in the crimped regions 44, 48 relative to the folds in the central area thus may be on the order of 2:1 to 20:1, with a preferred range being 5:1 to 8:1. The crimped regions 44, 48 include compressed folds having a higher frequency than the parallel folds 42 of the central area. Further, the folds in the crimped regions 44, 48 may not be aligned an may be offset by an angle, for example up to 10 to 200. Some of the folds in the crimped regions 44, 48 do not extend fully across, some of the folds in the crimped region 44, 48 may intersect other folds in the crimped regions 44, 48, some of the folds in the crimped regions 44, 48 terminate within the crimped regions 44, 48.

The pattern in the crimped regions 44, 48 thus may be referred to as a criss-crossing pattern. The folds in the crimped regions 44, 48 thus lock in the pattern of the folds throughout the dunnage. In some embodiments, the dunnage material has a length approximately equal to the length of the unprocessed material and a width that is approximately 15 to 25% of the length of the unprocessed material. In some embodiments, the dunnage material is approximately symmetrical and the outer sections comprise gathered end areas 46 up to the crimped regions 44. In some embodiments, a further crimped region may be formed generally centrally of the common pleat an optional center roller.

FIG. 8 illustrates a top view of the dunnage system 10 with the unprocessed material being fed into the dunnage system and the created dunnage 40 being expelled from the dunnage system, in accordance with one embodiment. The system 10 may include a dunnage machine 17 such as a cross-crumpling dunnage machine 17. The cross-crumpling dunnage machine 17 can pickup unprocessed paper from the material source 12 and feed it into a crumpling mechanism 16. The unprocessed paper can be cross-crumpled to form dunnage 40 and can further be fed out into the dunnage handler 18. The dunnage 40 may enter the dunnage handler 18 at a head end 501, travel along a handling direction 522 into a handling area 503, and be retrieved from a trailing end 505.

To create the dunnage shown in FIG. 7, the sheet of unprocessed material is fed from the pick-up system into the crumpling mechanism with the ends of the sheet of unprocessed material generally extending between the pulley end 20 of the dunnage system to the motor end 22 of the dunnage system. The crimped regions 44 of the dunnage 40 are disposed in the portions of the material that have passed through the crumpling zones 310, including the portion that passed laterally between the entry-side rollers 302, 304 and the exit-side rollers 306, 308 of the crumpling mechanism 16. Thus, a first crimped region is created by the entry-side rollers 302, 304 and exit-side rollers 306, 308 proximate the first pivoting guide plate 26*a* and first fixed guide plate 24*a* and a second crimped region is created by the entry-side rollers 302, 304 and exit-side rollers 306, 30 proximate the third pivoting guide plate 26*b* and third fixed guide plate 24*c*.

As discussed, the cross-crumpled dunnage 40 can be a relatively elongate crumpled sheet of paper formed from an individual sheet of preprocessed paper. As shown, the long dimension 602 of the processed paper can be oriented substantially in a transverse direction 573 relative to the handling direction 522 and the short dimension 604 of the paper can be oriented substantially parallel to the handling direction 522. The common folds or pleats 42 extend between the crimped regions 44. Ruffled areas 48 extend outwardly from the crimped regions 44.

FIG. 9*a* illustrates a side view of the first pivoting guide plate 24*a*, first fixed guide plate 26*a*, and associated entry-side rollers 302, 304 and exit-side 306, 308, looking towards the motor end. FIG. 9*b* illustrates a side view of the third pivoting guide plate 24*c*, third fixed guide plate 26*c*, and exit-side rollers 306, 308, looking towards the motor end.

As shown, the exit-side rollers 306, 308 are provided at an location vertically above the entry-side rollers 302, 304. The entry-side rollers 306, 308 are generally inboard and the exit-side rollers 302, 304 are generally outboard. In some embodiments, these orientations may be varied.

FIG. 10 illustrates a view of the third pivoting guide plate 24*c* and associated exit-side rollers 306, 308 with a view of the eccentric assembly 351 between the entry-side rollers and the exit-side rollers. The entry-side rollers are provided behind the support structures 24*c* and 26*c*. FIG. 11 illustrates a cross sectional view of the eccentric assembly 351. In the preferred embodiment, the exit-side rollers 306, 308 are driven from one of the entry-side roller shafts 326, 328 via a reduction mechanism, the eccentric assembly 351 in the embodiment shown. In other embodiments, the exit-side rollers 306, 308 can be driven by the motor 32 independently of the entry-side rollers 302, 304. In yet other embodiments, at least one of the exit-side rollers may not be driven and may instead be free spinning and driven by its bias and abutment against the other exit-side roller. For example, the rear exit-side roller 308 (in some embodiments, the pivoting guide plate low-speed roller) may be biased and abut against the front exit-side roller 306 (in some embodiments, the fixed guide plate low-speed roller). The operation of the eccentric assembly 351 is shown and described only with respect to the rollers shown. However, as described with respect to FIG. 4, each roller shaft may support additional rollers (for example provided at additional support structures). Accordingly, the eccentric assembly 351 may be used with each of the corollary rollers shown in FIG. 4 of the rollers shown in FIGS. 10 and 11.

The reduction mechanism 351 of the preferred embodiment is an eccentric assembly 351 including an eccentric bearing 340, eccentric bearing crank 342, first and second one-way clutch bearings 344 and 346, and an oscillating crank 348. The reduction mechanism 351 governs the rotation ratio between one or both of the exit-side roller shaft, preferably the forward exit-side roller shaft 324, and at least one of the entry-side roller shafts, preferably the forward entry-side roller shaft 328.

In the example shown, an eccentric bearing 340 is mounted on the forward entry-side roller shaft 328. An eccentric bearing crank 342 is associated with the eccentric bearing 340, mounted thereby eccentrically to the forward entry-side roller shaft 328.

A first one-way clutch bearing 344 is mounted on the forward exit-side roller shaft 324. An oscillating crank 348 is associated with the first one-way clutch bearing 344 and is connected thereby to the forward exit-side roller shaft 324. The first one-way clutch bearing 344 is configured to allow relative rotation between the oscillating crank 348 and the forward entry-side roller shaft 328 when the oscillating crank 348 rotates with respect to the shaft 328 in a backwards direction (counterclockwise when viewed as in FIG. 10), opposite the direction of the shaft 328 when causing the entry-side rollers 302, 304 to rotate to move the sheet in a forward direction along the path through the entry-side rollers, the crumpling zone, and the exit-side rollers. The first one-way clutch bearing 344 is configured to restrict, and preferably prevent, relative rotation of the oscillating crank 348 with respect to the shaft 328 in the forward direction (clockwise when viewed as in FIG. 10), thus preferably coupling the oscillating crank 348 to the shaft 328 to allow the oscillating crank 348 to rotate the shaft 328 in the forward direction to move the dunnage forward along the path through the entry-side rollers, the crumpling zone, and the exit-side rollers.

A second one-way clutch bearing 349 is associated with the forward exit-side roller 306 and the forward exit-side roller shaft 324 to connect the forward exit-side rollers 306 to the forward exit-side roller shaft 324. The second one-way clutch bearing 349 is configured to allow the forward exit-side roller 306 to rotate in the forward direction (clockwise when viewed as in FIG. 10) with respect to the shaft 324, but to restrict, and preferably prevent, relative rotation of the oscillating crank 348 with respect to the shaft 324 in the backwards direction (counterclockwise when viewed as in FIG. 10), thus preferably coupling the forward exit-side roller 306 to the shaft 324 to allow the shaft 324 to rotate the roller 306 in the forward direction to move the dunnage forward along the path through the entry-side rollers, the crumpling zone, and the exit-side rollers.

The forward entry-side roller shaft 328 is connected to the motor and is driven via the belt. Rotation of the forward entry-side roller shaft 328 causes rotation of the forward entry-side roller 302 and of the eccentric bearing 340. As the eccentric bearing 340 is rotated, the eccentric bearing crank 342 is reciprocated towards and away from the forward exit-side roller shaft 324. This reciprocating motion reciprocates the oscillating crank 348 and intermittently causes the forward exit-side roller shaft 324 to rotate in the forward direction, each time the eccentric bearing 340 pulls the eccentric bearing crank 342 downwards, away from the exit-side roller shaft 324 since the first and second one-way clutch bearings 344, 349 are in an engaged condition, coupling the rotation of the oscillating crank 348 to the forward exit-side roller 306. Upwards movement of the eccentric bearing crank 342, towards the forward exit-side roller shaft 324, does not cause rotation of the roller shaft 324 in the embodiment shown, since the first or both the first and second one-way clutch bearings 344, 349 are disengaged, allowing relative movement between the parts. In alternative embodiments, other portions of the eccentric bearing 351 stroke can cause the rotation of the forward exit-side roller shaft 324. The second one-way clutch bearing 349 also can be used to help keep the forward exit-side roller 306 from rotating backwards.

The ratio of speed reduction between the forward entry-side roller shaft 328 (and thus the entry-side rollers 302, 304) and the forward exit-side roller shaft 324 (and thus the low-speed rollers 306, 308) may be controlled by adjusting the length of the cranks 342,348 or their attachment points. For example, relocating the pivotal connection between the cranks closer to the exit-side roller shaft 324 along the oscillating crank 348 would decrease the reduction ratio by increasing the angle of rotation imparted on the exit-side roller shaft 324 during each reciprocation. Conversely, placing the pivotal connection further from the exit-side roller shaft 324 along the oscillating crank would increase the ratio.

The preferred embodiment of the reduction mechanism allows a very large reduction in a small space and using relatively inexpensive components. Other embodiments may drive the rear exit-side roller shaft 322 via a large pulley or a set of gears. Thus, in one embodiment, a single motor drives both the high-speed rollers and the low-speed rollers with the high-speed rollers being directly driven and the low-speed rollers being driven via the eccentric gear reducer. The eccentric gear reducer provides a simple form of speed reduction between the high-speed rollers and the low-speed rollers to effect crumpling in the crumpling zone. The eccentric and bellcrank-oscillating arm geometry govern the ratio between upper and lower common shafts.

In some embodiments, the motor may run at speeds of up to approximately 2000 rpm with a primary reduction from the entry-side rollers 302, 304 to the exit-side rollers 306, 308 as shown in Tables 1 and 2, below. In some embodiments, the rollers may be approximately 1-5" in diameter, with one embodiment having 2.25" diameter rollers 302, 304, 306, 308. In such embodiments, Tables 1 and 2 show exemplary relationships of tangential velocities vs. ratios.

TABLE 1

| | |
|---|---|
| Wheel diameter (mm) | 57.15 |
| Primary Reduction | 4 |
| Secondary Reduction | 25 |

TABLE 2

| | High-speed Rollers | | | Low-speed Rollers |
|---|---|---|---|---|
| Motor RPM | Rev./sec. | Tangential velocity (mm/s) | Feet/sec | Tangential velocity (mm/s) |
| 2000 | 8.3 | 1496.2 | 4.9 | 59.8 |
| 1500 | 6.3 | 1122.1 | 3.7 | 44.9 |
| 1000 | 4.2 | 748.1 | 2.5 | 29.9 |

Effective ratios of high-speed roller velocity to low-speed roller velocity to create dunnage product have been found within the range of 15 and 35:1. This range may be increased when more than one stage or different materials or papers are used. When used to crumple sheet material of paper having 18×24×30 pound paper, such ratios create a dunnage product having cross directional flow pleats with a pitch of 10-20 mm in width and that are creased by the shearing action of the tangential velocity differential of the high-speed rollers and the low-speed rollers. The material used may have any suitable finish, such as recycled MS or MG finish. The lateral spacing, the height of the crumpling zone, and the dimensions of the zone may be altered. The creased areas aid the dunnage in maintaining a defined v-shaped pattern in the pitches of the pleats or folds. Further, when only one stage is used, the following formulas may be used to develop an appropriate ratio of high-speed roller velocity to low-speed roller velocity.

$$\underset{\substack{of\ each\\ Stage}}{\text{Ratio}} = \sqrt[\substack{of\ number\\ of\ stages\\ n}]{\begin{matrix}\text{Total}\\ \text{Ratio}\end{matrix}}$$

or $$\Sigma R_1 + R_2 + R_{3**} = \begin{matrix}\text{Total}\\ \text{Ratio}\end{matrix}$$

In some embodiments, the rollers 302, 304, 306, 308 may have structural characteristics to further aid in production of dunnage. For example, the rollers may be provided with cogs, pins (such as a plurality of radial mounted pins), or other structure to interact with a similar structure or complementary structure (such as a groove) in the adjacent roller. Further, the rollers may be provided of any suitable material. In some embodiments, the rollers may be provided in a combination of selective surfaces ranging from hard to soft and smooth to rough. In some embodiments, the rollers comprise a medium to hard durometer elastomeric and metallic and/or plastic mating rollers.

Referring now to FIG. 2, the crumpling system includes a material source 12, an in-feed mechanism for feeing material from the material source 12 to the crumpling mechanism, and a dunnage handler for outfeeding material from the crumpling mechanism.

Discussion will now be made of the infeed mechanism for feeding material from a material source into the crumpling mechanism. As shown in FIG. 2, a stack 132 of sheet stock can be held on a sheet stock supply member 110, such as on a tray. Other types of paper containing devices may be used, and different shapes and sizes can be used. The stack 132 can comprise a plurality of paper sheets, which are preferably independent sheets that are not attached to each other, although in other embodiments, a long sheet or attachments between the sheets may be used. The tray 110 can hold a container for the paper sheets, such as a box or corrugated cardboard (with an opening for engaging the sheets) or paper or other suitable material, or the paper sheets can be placed directly inside the tray 110.

The tray 110 can be a pivoting tray, such that it pivots about a pivot pin 112 on one or both lateral sides of the tray. The pivot pin 112 can hold the tray 110 to frame 118, and can comprise a screw, pin, nail, or other suitable connection or linkage. The pin 112 is preferably oriented with it axis extending laterally with respect to the crumpling device, and is preferably disposed slightly off-center from the center of gravity of the portion pivoted therefrom. In one embodiment, a lengthwise distance 115 between a pivoting axis 119 of the pin 112 and a proximal end 114 of the tray 110 is less than a lengthwise distance 117 between the pivoting axis 119 of the pin 112 and a distal end 116 of the tray 110. The pivot pin 112 is engaged against the frame 118 such that it is strong enough to hold the pivoting sheet supply 110 against the frame 118, but yet allows the pivoting sheet supply 110 to pivot about the pivot axis 119 in a clockwise direction 122 and a counter-clockwise direction 124.

The pivot pin 112 can be slightly off-center with respect to the length of the pivoting sheet supply 110. In FIG. 2, the pivot pin 112 is off-center with respect to the length of the pivoting sheet supply 110 such that the length of a distance between the pin 112 and a proximal end 114 of the pivoting sheet supply 110 is less than the length of the distance between the pin 112 and a distal end 116 of the pivoting sheet supply 110. Therefore, the center of gravity of the pivoting sheet supply 110 is such that the pivoting sheet supply 110 will tend to push in a downwards direction 126 at the distal end 116 of the pivoting sheet supply 110, and will tend to push in an upwards direction 128 at the proximal end 114 of the pivoting sheet supply 110.

The center of gravity of the tray 110 is preferably disposed with respect to the pivoting axis 119 thereof such that the tray 110 will tend to push downwards at the distal end 116 and upwards at the proximal end 114. This retains the stack 132 of sheeting material in the tray in contact with an engagement portion 140 of the infeed mechanism 100. The engagement portion 140 of the embodiment shown includes one or more rollers, such as pick-up wheel 140 of the infeed mechanism 100, against which the top sheet 130 of the stack 132 is biased into abutment. The geometry and pivot axis can be selected so that an approximately constant force is maintained against the pick-up wheel 140 as the stack 132 is depleted to help pick up a single sheet of paper from the stack 132. The geometry and pivot axis can be selected such that such that the tray 110 and the engagement portion 140 are biased towards each other for biasing the engagement portion 140 against the sheets for gripping the sheets in the stack 132. The tray 110 and the engagement portion 140 can be biased based on gravity. The center of gravity of the tray 110 allows the tray to pivot toward the engagement portion 140. The engagement portion 140 can be located above, or directly above, the supply mechanism or tray 110. The engagement portion 140 can be located directly above a first edge of the top sheet of the stack 132.

The sheet stock can comprise a stack of paper sheets which can be of any suitable size, and preferably of roughly 24"×18", although other dimensions can be utilized, as will be apparent to one having ordinary skill in the art, to be fed into the pick-up wheel 140. It should be noted that any size paper sheeting material, or other substrate, is contemplated by the present disclosure, although paper is preferred. In one embodiment, the sheeting material can be around 24"×48". The sheeting material may be smaller or larger, such as up to a full pallet size (about 40"×48"), although larger sheets can be used in other embodiments. Moreover, the sheeting material may be of various densities, such as between 20 lb and 70 lb. Kraft paper. The sheeting material may be virgin or recycled. Moreover, the sheeting material may be intermixed so as to deliver 2 sheets or more at once of the same basis weight, or a combination of basis weights. A single sheet selector 30 can be placed inside a paper guide 144 so that only a single sheet of paper travels from the pick-up wheel 140 to the transfer roller 150. Therefore, if two (or more) sheets of paper are picked up by the pick-up wheel 140, the bottom sheet(s) will be blocked so that only one sheet (the top sheet) travels along the path to the transfer roller along the paper guide 144. The single sheet selector 30 can be adjusted so that two, three or more sheets travel along the paper guide 144 to the transfer roller 150.

FIG. 12 is a perspective view of a pick-up system of a dunnage machine. As seen in FIG. 12, a stack 132 of papers is supplied in the tray 110. The pick-up wheel 140 is in contact with the paper sheet 130, due to the upwards force F at the proximal end 114 of the tray 110 and the downwards weight W due to the weight of the stack 132 and the tray 110. Thus, the pick-up wheel 140 can be immediately above the paper sheet 130 and is in contact with and able to pick up the paper sheet 130 directly from the stack 132. The pick-up wheel 140 is located preferably along a middle of the shaft 148 that rotates, which in turn rotates the pick-up wheel 140. The tray 110 is also centered so that the pick-up wheel is in contact with a center area of the paper sheet 130. The paper sheet 130 is picked up by the pick-up wheel 130 and travels along the paper guide 144 to the transfer roller 150. The paper guide 144 can have curved walls to allow an easy path for the paper sheet 130. The transfer roller is also centered and located along a middle of the shaft 152 that rotates, which in turn rotates the transfer roller 150. A frame 28 may provide support for the pick-up wheel 150 and transfer roller 150. The shaft 148 is connected to pulley 170, and the shaft 152 is connected to pulley 178, which are rotated by belt 180. The belt 180 can be powered by a motor (not shown). The belt travels on a path along pulleys 170, 178, 176, 174 and 172. The pick-up wheel 140 has a surface material that is preferably selected to have the desired traction with the top sheet of the stack 132. Suitable materials include, for example, elastomers such as rubber, and may be smooth or textured or have other shapes.

The pick-up wheel 140 is preferably located at or near the lateral center of the stack on the tray and preferably includes only a single wheel or a plurality of wheels that are spaced close together. The central location of the pick-up wheel 140 and narrow lateral width thereof allow the paper sheet 130 that is drawn into the intake path 134 to rotate generally in plane, laterally with respect to the path. Lateral guide walls, which can be a continuous and/or curved, are provided by the sheet guide 144, which are disposed so that if the paper sheet 130 in the stack 132 on the tray 110, or other supply device, is not straight, it can be picked up by the pick-up wheel 140 and as it travels along the paper guide in contact with the sidewalls of the sheet guide 144, the pick-up wheel 140 will cause the sheet to straighten out as it travels along the sheet guide 144, preferably so it is straight with respect to the intake path 134 when it reaches the transfer roller 150 and crumpling zone 310. An electromechanical clutch 179 can be provided that allows for intermittent control of the engagement portion 140 for engagement of a sheet 130 from the sheet supply 110.

Referring back to FIG. 3, the path taken by a paper sheet 130 coming off the paper stack 132 can be seen. A paper sheet 130 on a paper stack 132 with a first top side exposed is picked up by the pick-up wheel 150, which can be driven. The pick-up wheel can engage a central portion of the paper sheet 130, and also an edge portion of a top side of the paper sheet 130. The paper sheet 130 moves along a intake path 134 in a first direction, which can be an intake direction, and sheet guide 144 to the transfer roller 150. A transfer assist roller 160 can assist by trapping the paper sheet 130 in between the transfer roller 150 and transfer assist roller 160. The paper sheet 130 is then turned around on transfer roller 150 along path 136 such that when it comes off the transfer roller 150 the paper sheet is traveling in a different direction 138, and can be turned around such that a bottom side of the paper sheet 130 is now on top. The transfer roller 150 can be driven, and the transfer assist roller 160 can be undriven. The direction 138 can be approximately 100° from the first direction of the intake path 134, or approximately 130-150° from the first direction of the intake path 134, such that the intake path substantially reverses upon itself.

The paper sheet 130 then travels along second direction 138 over a third roller, such as traction bearing 165 that again changes the direction of the paper sheet 130 from the second direction 138 to a third direction 139, which can be opposite than the intake path reversal upon itself. The traction bearing 165 can be driven, and can be above the first roller. The third direction can be approximately 70-110° from the second direction, and can be approximately greater than 80°, and can be 90° from the second direction. The paper sheet 130 then enters the crumpling zone 310, and can enter the crumpling zone in a third direction 139 that can be a crumpling direction. The crumpling direction can lead vertically upward into the crumpling zone 310. The crumpling zone 310 can be above or directly above the traction bearing 165. Such arrangement of the infeed mechanism being below the crumpling mechanism saves space, and particularly, horizontal space.

Now referring back to FIGS. 9*a* and 9*b*, the intake path of the paper sheet 130 can also be seen by the dotted line 200. As illustrated in FIGS. 9*a* and 9*b*, the paper sheet 130 is picked up by the pick-up wheel 140 and enters the infeed zone 152. The paper sheet travels along a paper guide 144 along an infeed ramp 162 up to the transfer roller 150. The infeed ramp can be a slightly inclined surface along the paper guide 144, such as at an angle between about 10° to 60°, and can be for example about 30° to forty-five degrees. As the paper sheet 130 travels along the transfer roller 150, the transfer roller 150 changes the direction of the paper sheet 130 as described above. The paper sheet then travels along the path 200 along the traction bearing 165 which changes the path direction 200 of the paper 130 again, to substantially a vertical direction, where the paper sheet then enters the crumpling zone 310.

FIG. 13 illustrates a partial cut-away view thereof of the pivoting sheet supply 110 and a sheet supply area 155. As shown in FIG. 13, a stack 132 of paper sheets 130 can be placed inside the pivoting sheet supply 110 such that the edges of the paper sheets 130 are in touch with the inner walls of the pivoting sheet supply 110. As shown in FIG. 13, the pivoting sheet supply 110 can be configured to naturally hold the stack 132 of paper sheets 130 in place using rear wall 113 and side wall 11. Other orientations can alternatively be used. Preferably, there is no wall along the proximal end 114 of the pivoting sheet supply 110, so that the edges of the paper sheets 130 are in contact with a pick-up wheel 140. Alternatively, a wall on the proximal end 114 can have a lower height such that the edges of the paper sheets 130 are still in contact with the pick-up wheel 140.

Further, as shown in FIG. 13, the weight of the stack 132 of paper sheets 130 located in the sheet supply area 155 will further assist pushing the distal end 116 of the pivoting sheet supply 110 in a downwards direction 126, and pushing the proximal end 114 of the pivoting sheet supply 110 in an upwards direction 128. Because the pivot pin 112 is located "off-center", it allows the weight of the pivoting sheet supply 110 and the stack 132 of paper sheets 130 to push the pivoting sheet supply 110 in such manner.

Because the weight of the stack 132 and the weight of the pivoting sheet supply 110 push the proximal end 114 of the pivoting sheet supply 110 in an upwards direction 128, this allows the stack 132 of sheeting material in the tray 110 to be in contact with one or more rollers, such as the pick-up wheel 140. The geometry and pivot pin 112 location is such that an approximately constant force is maintained against the pick-up wheel 140 to help pick up a single sheet of paper, or more than one sheet, if preferable. As one or more paper sheets 130 come off the stack 132 by the pick-up wheel 140, the pivoting sheet supply 110 pivots about the pivot pin 112 and moves slightly in an upwards direction 128 at the proximal end 114 of the pivoting sheet supply 110, such that the pick-up wheel 140 is constantly in touch with a top paper sheet 130 of the stack 132. Other devices besides the pick-up wheel can be used as a pick-up member for engaging the top sheet 130 of the stack.

The pivot pin 112 can be positioned so that the pivoting sheet supply 110 hangs therefrom, but other arrangements can be used to provide a similar arrangement. The pivot axis 119 can be disposed above the sheet supply 155 such that when the sheet supply 155 is full, the center of gravity of the loaded sheet supply 110 is below the pivot axis 119. Gravity is preferably used to pivot the tray 110 to retain the sheets in association with the infeed mechanism. However, other embodiments can be used that can control the pivot movement of the pivoting tray 110, such as, but not limited to, use of weights on both sides of the pivoting tray 110. Between a fully loaded condition of the tray 110, and an empty condition of the tray 110, the tray 110 can pivot away from and towards the infeed mechanism/engagement portion 140. In an exemplary embodiment, in the full position, the distal side 116 of the tray 110 is higher than the proximal side 114, and in the empty position the proximal side 114 is higher than the distal side 116. In a middle position, the tray 110 can be substantially level. The pivoting axis 119 is eccentric to the center of gravity and to the sheet supply area 155 in a preferred embodiment.

The engagement portion 140 can be configured for feeding more than one of sheet from the pivoting sheet supply 110 in an overlapping arrangement into the paper crumpling mechanism. The tray 110 can be configured and dimensioned for the individual sheets arranged as a stack, and the engagement portion 140 can be configured for picking up the top sheet in the stack. The engagement portion 140 can be configured for drawing one or more paper sheets from a top of the stack to the paper crumpling mechanism. The engagement portion can also be configured for engaging or picking up a sheet 130 that is not the top sheet.

FIG. 14 is a perspective view of a box of paper that can be used with a pivoting sheet supply. The pivoting sheet supply 110 can hold a container 212 for the paper sheets, such as a box or corrugated cardboard or other suitable material. The container 212 can alternatively be a soft envelope of paper or other suitable material, but is preferably at least semi-rigid to help maintain the alignment of the stack 132 regardless of handling and the current thickness of the stack 132. The container 212 can have an access opening 214. With the container 212 placed inside the pivoting sheet supply 110, the pick-up wheel 140 can come in direct contact with the exposed supply sheet 130 of the stack 132 through the access opening 214, allowing the supply sheet 130 to be fed into the dunnage machine. Preferably, the tear-away portion 216 is connected to the remainder of the container 212 with a perforated line 218 configured to expose the access opening 214, to expose one of the supply sheets 130 in the stack 132. The end of the container 212 with the access opening 214 would be placed at the proximal end 114 of the pivoting sheet supply 110.

Discussion will now be made of the dunnage handler for controlling outfeed of the dunnage from the crumpling mechanism. FIGS. 1 and 2 illustrate a preferred embodiment of a dunnage system 10 using a dunnage handler 18 is shown. As shown more closely in FIG. 15, the dunnage handler 18 may take the form of a dunnage accumulator adapted to accumulate dunnage 40 fed out of a dunnage machine 17, for example to allow packing personnel to retrieve the dunnage 40 from the accumulator for use in protective-packing operations. Alternatively, the dunnage handler 18 may be configured to discharge dunnage 40 or it may be reconfigurable between an accumulator configuration and a discharger configuration.

Referring now to FIGS. 9*a* and 9*b*, the dunnage handler 18 is shown integrated with a crumpling mechanism 16 of the dunnage machine 17. The dunnage handler 18 is preferably constructed as a dunnage accumulator that is adapted to accumulate dunnage 40. The dunnage handler 18 can include an intake 515 at the head end 501, a retrieval port 519 or other exit at the trailing end 505, and the handling area 503 can be in the form of an accumulation space 517. The dunnage handler 18 can include one or more dunnage handling portions. In the case of a dunnage accumulator, the handling portions can be adapted as holding portions to hold and accumulate dunnage. Alternatively, the handling portions can be adapted to discharge or direct the flow of dunnage. The holding portions may be associated with one another via an articulation. As such, the holding portions may be allowed to articulate relative to one another to accommodate an accumulating amount of dunnage. The holding portions can include a bottom holding portion 502 and a top holding portion 504 each mounted to and extending from respective support structures on the dunnage machine 17. The top and bottom holding portion 504, 502 can be positioned and adapted to cooperatively accumulate dunnage 40.

The bottom holding portion 502 can be in the form of one or more bottom rails 508 each extending from a support structure on a dunnage machine along the handling direction 522. The bottom rail 508 can include a first portion 524, which extends from a head end at the support structure to a trailing end. The trailing end of the first portion 524 leads to an accumulating feature 510. The rail 508 can further include a second portion 526, which returns from the trailing end to the head end at the support structure. The first portion 524 of the rail 508 can be arranged parallel to the second portion 526 or in another suitable orientation. The second portion 526 can be positioned below the first portion 524, and the accumulating feature 510 can be connected there between. While the rails 508 shown are made from bent, cylindrical rods, alternative rails can have other cross-sections and be made of other materials and by other methods. Suitable rail materials include materials that are sufficiently rigid to support the full load of dunnage and pressures caused by packing the dunnage into the accumulation space 517, such as steel and aluminum alloys and other metals, plastics, and composite materials. In a preferred embodiment, the bottom rail 508 can be a steel rod or tube. Alternative bottom holding portions can be configured as a shelf or tray for receiving and supporting the dunnage fed out of the dunnage machine.

The preferred bottom rail 508 includes a first portion 524 and an accumulating feature 510. The accumulating feature 510 is shaped to keep the dunnage 40 passing along an upper surface of the bottom rail 508 from falling or being pushed out of the accumulation space 517 during the normal operation of the dunnage machine 17, without intentionally being removed, such as by a user or another device. The accumulating feature 510 can include an accumulating portion 511 that extends from the first portion 524 of the bottom rail 508 to partially close off or narrow the retrieval port 519. As shown, the accumulating portion 511 can extend in the same direction as the first portion 524 of the bottom rail 508 and gradually turn into the accumulation space 517. This gradual turn can be a radius turn or some other arcuate or segmentally sloped shape. Alternatively, the accumulating portion 511 can extend in the same direction as the first portion, but turn more abruptly in the accumulation space 517. In yet another alternative, the accumulating portion can extend directly into the accumulation space 517 rather than extending initially in the same direction as the first portion 524. Material being advanced along the upper surface of the bottom rail 508 through the dunnage handler 18 can encounter the accumulating portion 511 of the accumulation feature 510 which can resist the continued travel of the material. However, the gradual turn of the accumulating portion 511 may allow dunnage 40 to be pulled out of the retrieval port 519 of the accumulator without getting hung up or snagged on the accumulating feature 510. Preferably, the rails 508 are smoothed and/or rounded to keep from snagging or tearing the dunnage 40.

The accumulations feature 510 can also include a transition portion 513 connected to the trailing end of the second portion 526 of the bottom rail 508 and the second portion 526 can return to the dunnage machine 17. This transition portion 513 may be any shape and may be adapted to accommodate any position of the second portion 526 of the bottom rail 508. The transition portion 513 may abruptly return to the trailing end of the second portion 526 or it may gradually return via an arcuate or radiused shape to the trailing end of the second portion 526. As shown in FIGS. 9*a* and 9*b*, the transition portion 513 can have a rounded shape when viewed from the side of the accumulation space 517, and can be in the form of a circle or an eye for instance. The transition portion 513 can be positioned in-plane with the first and second portions 524, 526 of the bottom rail 508 and can have a diameter greater than the distance between the first and second portions 524, 526. The transition portion 513 can be generally vertically centered relative to each of the first and second portions 524, 526 so as to extend above and below each of the first and second portions 524, 526.

Suitable support structures can be included such as, for example, a base, a plate, a bracket, or a mounting surface. Other suitable support structures can be provided. As shown in FIGS. 9*a* and 9*b*, the support structure of the bottom rail 508 can include a fixed guide plate 26. That is, the bottom rail 508 can be mounted, such as by affixing, on the fixed guide plate 26. The fixed guide plate 26 can provide a stationary element securely positioned within the dunnage machine. The guide plate 26 can be a generally planar element positioned to support rollers associated with the crumpling mechanism 16. The planar surface of the guide plate 26 can have a normal direction directed transverse to the handling direction 522 and the edge surface of the guide plate 26 can have a normal direction directed parallel to the handling direction 522. The edge surface of the guide plate 26 can include a bore or bores in alignment with the rail or rails 508 of the bottom holding portion 502. The rail 508 can be inserted into the bore and secured via a welded, glued, epoxied, or other adhering connection, or it can be press fit or secured with a fastener. The connection of the first and/or second portions 524, 526 of the bottom rail 508 to the support structure are preferably substantially rigid to allow for a cantilevered support.

As mentioned, and as shown in FIG. 15, the bottom holding portion 502 can include one or more bottom rails 508. In the case of multiple rails 508, the rails 508 can be spaced laterally from one another and each rail 508 can extend from separate fixed guide plates 26. The guide plates 26 can be spaced laterally from one another and can define the lateral spacing of the rails 508. The longitudinal dimension of the dunnage unit 40 can extend transverse to the handling direction 522 as shown in FIG. 10. As such, laterally spaced bottom rails 508 may effectively support the dunnage 40 as it is fed out of the dunnage machine 17 through the intake 515 of the dunnage handler 18 and into and across the accumulation space 517. The bottom holding portion 502 can include any number of bottom rails 508 to support the dunnage material 600. The lateral spacing of the bottom rails 508 can be based on the sheet width being used for the dunnage. The lateral spacing can be between approximately 70% and 95% of the sheet width. Preferably, the lateral spacing can be approximately 80% of the sheet width. Accordingly, where an 18 inch wide sheet is used, the lateral spacing of the bottom rails can be between approximately 10 inches and approximately 16 inches, such that 1 to 4 inches of dunnage extend beyond each bottom rail. For 30 inch wide sheets, the lateral spacing of the bottom rails 514 can be between approximately 12 inches and approximately 28 inches, such that 1 to 9 inches of dunnage extend beyond each bottom rail. The relatively large spacing between the bottom rails provides for retrieval of dunnage 40 by pulling it through the space between the bottom rails 508 in addition to pulling them through the retrieval port 519.

Referring to FIGS. 9*a* and 9*b*, the top holding portion 504 can be in the form of one or more top rails 514 each extending from a support structure on a dunnage machine 17 to an accumulating feature 516. The top rail 514 can have a first arcuate portion 528 and a second, relatively straight, trailing portion 530.

FIG. 16 is a side view of an upper holding portion of a dunnage handler. As shown, the arcuate shape of the first portion 528 of the rail 514 can be adapted for accumulation of dunnage 40. The first portion 528 of the top rail 514 may be an arcuate portion having a radius 521. The radius can range from approximately 4" to approximately 24". Preferably the arcuate portion may have a radius 521 of approximately 16". The first portion 528 may have an included angle 523 of approximately 60° to approximately 130°. Preferably the first portion 528 may have an included angle 523 of approximately 60°. The trailing portion 530 of the top rail 514 may include a length 529 of approximately 6 inches to approximately 15 inches beyond the arcuate portion 528. In a preferred embodiment, the trailing portion 530 may have a length 529 of approximately 12" or longer depending on the desired accumulation requirements. However, a radius, included angle, and trailing portion length with a value outside these ranges can be used. Each parameter can be selected to contain dunnage in the empty position with a minimal volumetric space and to optimize the volumetric space for containing dunnage in the full condition.

As such, and as shown best in FIG. 9*a*, the top rail 514 can be positioned to extend from the head end 501 of the dunnage handler 18 in a generally outward direction (e.g., along the handling direction 522) and a generally upward direction (e.g., perpendicular to the handling direction 522 and away from the accumulation space 517). The arcuate portion 528 of the rail 514 can then extend along an arc such that the rail 514 transitions from a generally outward and upward direction to a generally outward direction. Further extension of the arcuate portion 528 of the rail 514 can include transitioning to a generally outward and generally downward direction. The second relatively straight trailing portion 530 of the rail 514 can then continue in a generally outward and generally downward direction generally parallel to and in alignment with the trailing end of the arcuate portion 528. The accumulating feature 516 at the trailing end of the rail 514 can thus be positioned near or even below the accumulating feature 510 of a corresponding bottom rail 508 of the bottom holding portion 502. While the rails 514 shown are made from bent, cylindrical rods, alternative rails can have other cross-sections and be made of other materials and by other methods. Suitable rail materials include materials that can induce pressures on the dunnage 40 as it accumulates into the accumulation space 517, such as steel and aluminum alloys and other metals, plastics, and composite materials. In a preferred embodiment, the rails 514 can be made from a solid steel rod or hollow steel tube. Alternatively, the top holding portion can be constructed from a relatively flexible material adapted to provide secondary compression on the accumulating dunnage 40. For example, the top handling portion can be as shown and described in U.S. Provisional Patent Application titled Flexible Dunnage Handler, filed on Aug. 26, 2009.

The arcuate shape of the rail 514 described can accommodate a pile of dunnage 40 and the path of travel of the dunnage 40 can be closed off by the interaction of the top and bottom holding portions 504, 502. The natural tendency of accumulating dunnage 40 can be to form a heap of dunnage 40. That is, as multiple units of dunnage 40 enter the accumulation space 517 and are arrested from continuing through the retrieval port 519, the multiple units of dunnage 40 may pile up into a heap. The arcuate shape described together with the downward sloping trailing end can allow a heap of dunnage 40 to form and yet maintain a resistance to escape. That is, the upward and outward sloping head end leading to the arcuate shape can provide an accumulation space 517. The arcuate shape can also begin the downward sloping trailing end which can close off the accumulation space 517 and prevent the dunnage 40 from escaping. This escape prevention may be in the form of pressure exerted by the portion of the top rail 514 near the tailing end 505.

The accumulating feature 516 of the top rail 514 can be any shape and can function to arrest motion of material passing along the lower surface of the top rail 514. As discussed with respect to the bottom rail 508, the accumulation feature 516 can include an accumulating portion 525 and a transition portion 527. The accumulating portion 525 can extend transverse to the top rail 514 into the accumulation space 517. Alternatively, the accumulating portion 525 can first extend parallel to the top rail 514 and then, gradually or abruptly, turn into the accumulation space 517. The transition portion 527 can return out of the accumulation space 517 and provide a smooth or rounded end on the top rail 514. In some embodiments, the transition portion 527 may abruptly return out of the accumulation space 517 and in other embodiments, the transition portion 527 may gradually return. As shown, in FIG. 9*a*, the transition portion 527 of the accumulation feature 516 can extend from the accumulating portion 525 and return gradually out of the accumulation space 517 and can, for example, be in the form of a circle or eye. The transition portion 527 can be in a plane parallel to that defined by the first and second portions 524, 526 of the bottom rail 508. In the case of the circle or eye, the transition portion 527 can have a diameter larger than the thickness of the top rail 514 and may also be centered on the rail 514 causing it to extend above and below the rail 514 as shown. As such, material being advanced along the lower surface of the rail 514 from the dunnage machine 17 can encounter the accumulating portion 525 of the accumulating feature 516 which can resist the continued travel of the material. Additionally, with respect to the accumulating feature 510 on the bottom rail 508 and the accumulating feature 516 on the top rail 514, the smooth transition portions 513, 527 may function to prevent injury to personnel that may be reaching into the accumulation space 517 to retrieve dunnage 40.

As mentioned, the top holding portion 504 can include one or more top rails 514. In the case of a single top rail 514, the rail can be positioned at a selected location across the width of the accumulator. In a preferred embodiment, the rail 514 can be centered between two bottom rails 508. In the case of multiple rails 514, the rails 514 can be spaced laterally from one another and each rail 514 can extend from separate support structures. Similar to the multiple bottom rails 508, multiple top rails 514 can accommodate relatively elongate units of dunnage 40 as they are fed out of the dunnage machine 17 with a longitudinal dimension 602 transverse to the handling direction 522. The top holding portion 504 can include any number of top rails 514 and the top rails 514 may correspond to the number and location of the bottom rails 508 of the bottom holding portion 502. Alternatively, they may not correspond. However, as with the bottom rails 508, a preferred spacing of the top rails 514 may be approximately 70% to approximately 95% of the material width, or preferably approximately 80% of the material width, so as to accommodate retrieval of dunnage 40 from between the rails 514. As shown best in FIG. 8, the top rails 514 may be spaced from one another slightly less than the bottom rails 508. Alternatively, multiple top rails 514 can be positioned relatively close to one another, for example from approximately 2 to approximately 6 inches. In some embodiments, the rails may be spaced approximately 3 inches apart. In yet another alternative, the top rails 514 can converge toward a central position between two bottom rails 508. The convergence of these rails can be relatively gradual or relatively abrupt as the rails 514 extend along the handling direction 522. In the case of an abrupt convergence, the rails 514 can converge shortly after entering the handling area 503 shown in FIG. 9*a*. In the case of a gradual convergence, the rails can converge more toward the trailing end of the accumulator.

A crossbar 518 can also be included. In embodiments where more than one top rail 514 is included, the plurality of top rails 514 can be connected to each other by one or a plurality of crossbars 518. As shown, a crossbar 518 can extend laterally from a point on a top rail 514 to a corresponding point on a laterally spaced top rail 514. The crossbar 518 can be in the form of and can be made from the same or similar materials as the top rails 514. The crossbar 518 can follow an arcuate path.

FIG. 17 is a front, cross-sectional view showing a crossbar of a dunnage handler. The cross bar may have a radius 529 ranging from approximately 4" to approximately 48" or the cross bars may be relatively straight. In a preferred embodiment, the radius 529 can be approximately 20". The crossbar 518 can also have an included angle 531 defined by the radius 529 and the lateral spacing of the top rails 514. The included angle 531 can range from approximately 5° to approximately 180°. In a preferred embodiment, the included angle 531 of the crossbar 518 can be approximately 60°. It is noted that the longer the radius, the lesser the degree of curvature, and the smaller the included angle can be. However, as with the geometry of the top rails 514, the crossbar 518 can have values beyond the ranges mentioned. In some embodiments, the crossbar may be straight or the crossbar may be omitted. The crossbars 518 are preferably disposed and associated between the top rails 514 to couple the rails 514 together, as well as to provide a convenient handle for lifting the top rail 514 to open the accumulation space 517, and in some embodiments, to disengage the crumpling mechanism 16 to release any jams therein.

Referring again to FIG. 9*a*, the arcuate shape of the crossbar 518 can allow the crossbar 518 to remain clear from material passing along the lower surface of the top rails 514. That is, dunnage 40 traveling along the lower surface of the top rail 514 can have a longitudinal dimension 602 substantially parallel to the crossbar 518 and a travel direction substantially perpendicular to the crossbar 518. As such, a tendency may exist for the traveling dunnage 40 to snag, hang up, or otherwise get caught on laterally extending members such as the crossbars 518. The arcuate shape of the crossbar 518 can allow snags or hang-ups of dunnage 40 to be avoided, while still functioning to stabilize the plurality of top rails 514. Additionally, the crossbar 518 can be rigidly connected to each of the top rails 514 such that pivoting motion of one rail 514 is mirrored by each of the connected rails 514. As such, the plurality of top rails 514 can move in unison.

With continued reference to FIG. 9*a*, the support structure to which the top holding portion 504 is connected can be on an opposing side of the outfeed area 506 from the support structure of the bottom holding portion 502. As such, the material fed out of the dunnage machine 17 can pass between the support structures, through the outfeed area 506 and into the intake area 515 and accumulation space 517 between the top holding portion 504 and the bottom holding portion 502. In some embodiments, the support structure of the top rail 514 can be aligned with the support structure of a corresponding bottom rail 508 and, as such, the two rails 514, 508 can be generally in line with one another.

Suitable support structures can be included such as, for example, a base, a plate, a bracket, or a mounting surface. Other suitable support structures can be provided. As shown in FIG. 9*a*, the support structure of the top holding portion 504 can be a pivoting guide plate 24. The pivoting guide plate 24, while pivotally disposed, can be biased toward a generally stationary position and the top holding portion 504 can be secured to the guide plate 24 such that the position of the top holding portion 504 relative to the outfeed and intake areas 506, 515 can be maintained. The guide plate 24 can be a generally planar element positioned to support rollers associated with the crumpling mechanism 16 in addition to the top holding portion 504 of the dunnage handler 18. The planar surface of the guide plate 24 can have a normal direction directed transverse to the handling direction 522.

The top and bottom holding portions 504, 502 can be associated with one another via an articulation. The articulation may be a hinge, a sliding mechanism, or any other element allowing the top and bottom holding portions 504, 502 to move or articulate relative to one another and thus adapt to accumulating dunnage. As shown in FIG. 9*a*, the articulation may include a pivotal connection of the top holding portion 504 to the pivoting guide plate 24 together with the additional elements creating the relative position of the top and bottom holding portions 504, 502.

Regarding the pivotal connection, the top holding portion 504 can be pivotally connected to the pivoting guide plate 24. Several pivoting relationships may be used including hinges, pins, ball and socket arrangements and the like. As shown, the top holding portion 504 can be pivotally connected to the planar surface of the pivoting guide plate 24 via a pivot pin 532. In some embodiments, the top rail 514 can include a connecting plate 534 to facilitate pivotally connecting to the guide plate 24. The connecting plate 534 can be a relatively flat element adapted to be connected to the planar surface of the guide plate 24. In one embodiment, the top rail 514 can include a longitudinal slot for receiving the connecting plate 534. The connecting plate 534 can extend into the slot and be affixed to the top rail 514 creating a rigid connection between the connecting plate 534 and the top rail 514. This connection can be welded, glued, fused, or otherwise secured. Alternatively, the connecting plate 534 can include a slot for receiving the top rail 514 or a combination of these can be used. In some embodiments, the connecting plate 534 and the top rail 514 can be of molded construction and can be molded together or separate. The connecting plate 534 can be positioned adjacent to the guide plate 24 and secured with a pivot pin 532. The connecting plate 534 can include a pivot hole defining a pivot point of the top rail 514. The pivot pin 532 can pass through the pivot hole of the connecting plate 534 and into the guide plate 24. Other alternative configurations to permit pivoting can be used such as, for example, hinged configurations.

The pivoting motion of the top holding portion 504 can be limited by certain motion limiting features. These motion limiting elements may take the form of blocking elements that prevent motion of the top holding portion 504 beyond on given range of motion. In one embodiment, motion limiting elements may be positioned on the connecting plate 534 and the planar surface of the guide plate 24. As shown in FIG. 9*a*, the guide plate 24 may include an arcuate track slot 536 with a radius and a center point defined by the pivot point of the top holding portion 504. The connecting plate 534 of the top holding portion 504 can include a corresponding track pin 538 extending normal to the surface of the connecting plate 534. Where the connecting plate 534 is positioned adjacent to the planar surface of the pivoting guide plate 24, the track pin 538 extending from the connecting plate 534 can be positioned in the track slot 536. As such, the track slot 536 and track pin 538 can be motion limiting elements. That is, the motion of the track pin 538 can be limited to the range defined by the path of the track slot 536 and the track pin 538 may be prevented from moving beyond the ends of the track slot 536.

The track pin 538 can have a length less than, equal to, or greater than the thickness of the pivoting guide plate 24. The track slot 536 can have a width and the track pin 538 can have a diameter equal to or slightly smaller than the track slot width so as to slidably engage the track slot 536. The track slot 536 can define an arc length and can have radiused ends, the radius of the ends being substantially equal to one half of the width of the track slot 536. The track slot 536 has a length selected to provide the desired angular limits to the pivoting of the top holding portion 204. In one embodiment, the track slot 536 is positioned generally opposite the pivot point from the top holding portion 504 and can be centered on a horizontal line extending through the pivot point, although other positions with respect to the pivot point can be used. The track slot 536 can define an included angle 540 ranging from approximately 0° to approximately 120° about the pivot point. In other embodiments the included angle can range from approximately 15° to 90°. In still other embodiments the included angle can range from approximately 30° to 60°.

The interaction between the track pin 538 and the track slot 536 can define a range of motion of the top holding portion 504. That is, as the top holding portion 504 is pivoted about the pivot pin 532, the track pin 538 can encounter a first end of the track slot 536. As the top holding portion 504 is pivoted about the pivot pin 532 in the opposite direction, the top holding portion 504 may pivot through one full range of motion until the track pin 538 encounters the other end of the track slot 536 defining a full position. As such, the range of motion of the top holding portion 504 can be substantially equal to the included angle 540 of the track slot 536. The track pin 538 may be sufficiently rigid to arrest the motion of the top holding portion 504 upon abutting the ends of the track slot 536. In some embodiments, the top holding portion 504 may be used to counteract a pivotal biasing force applied to the pivoting guide plate 24. Accordingly, the shear capacity of the track pin 538 and the bearing capacity of the pivot limiting ends of the track slot 536 can be sufficient to sustain a force on the top holding portion 504 that counteracts this pivotal biasing force.

With reference again to FIG. 9*a*, the angular orientation of the track slot 536 and the radial position of the track pin 538 can be coordinated to control the position of the top holding portion 504. As shown, the top holding portion 504 is in an intermediate position, corresponding to a partial load of dunnage. An empty or start position 537 is shown in dashed lines and a full position can be defined. For example, if pivoted fully clockwise, a start position 537 may be defined by a head end rail angle 533 of approximately 0° to approximately 45° providing a trailing end rail angle 535 of approximately 30° to approximately 120°. Other start positions including those with angles outside the ranges mentioned can be defined. It is noted that the head end and trailing end rail angles 533, 535, as shown, can be defined relative to the horizontal direction for convenience, and in the preferred embodiment, the horizontal direction is substantially parallel to the bottom holding portion 502. In alternative embodiments, the bottom holding portion is in other orientations. As shown in FIG. 8, where the spacing of the top rails 514 is slightly less than the bottom rails 508, the trailing end of the top rails 514 may be allowed to pass between the bottom rails 508. Accordingly, as shown by the dashed lines in FIG. 9*a*, the accumulation feature 516 can be positioned below the accumulation feature 510 of the bottom rail 508 in the start position 537 thus closing off the retrieval port 519 against escape of dunnage. The accumulation feature 516 can be approximately 0 inches to 8 inches below the accumulation feature 510. Preferably, the accumulation feature 516 can be 4 inches below the accumulation feature 510. Alternatively, the start position 537 can be defined where the accumulating feature 516 can be positioned adjacent to or slightly above the accumulating feature 510 of the bottom holding portion 502. In yet another alternative, a larger space may occur between the accumulating features 510, 516. Where the start position 537 causes the top and bottom rails 514, 508 to overlap, a length 539 is defined extending from the intake area 515 to the point at which the rails overlap. As the top rail 514 pivots upward, the length 539 of the accumulation space increases thereby causing the accumulation space to increase both with respect to its height and its length 539.

The full position can be defined by limiting the upward motion of the top holding portion 504 to a particular radial position. The full position, for example, may be defined by a head end rail angle 533 of approximately 30° to approximately 120° providing a trailing end rail angle 535 of approximately 30° to approximately 00. Other full positions can be selected and can include rail angles outside the ranges defined. In one alternative, the upward motion can be unlimited. In still other alternatives, one or a plurality of intermediate positions may be defined.

In addition to the track slot 536 and track pin 538 interaction limiting the motion of the top holding portion 504, the motion of the top holding portion 504 may otherwise be caused by gravity and the accumulation of dunnage 40. With reference to FIG. 9*a*, the top holding portion 504 of the dunnage handler 18 may have a center of gravity located substantially above the accumulation space 517. As such, the weight of the top holding portion 504 acting at its center of gravity about the pivot pin 532 can define an accumulation resistive moment and can cause the top holding portion 504 to tend generally toward the start position, where the track pin 538 may be positioned fully clockwise in the track slot 536. Referring now to FIG. 2, where accumulated dunnage 40 is shown, as dunnage 40 is fed out of the dunnage machine 17 into the dunnage handler 18 and the dunnage 40 begins to accumulate, the dunnage 40 can exert a pressure on the lower surface of the top holding portion 504 due to the continuous outfeed of dunnage 40 from the crumpling mechanism 16. The pressure can counteract the accumulation resistive moment by pushing upward on the top holding portion 504 against the gravitation force. Where the pressure is sufficient to overcome the weight of the top holding portion 504, the top holding portion 504 can be lifted causing it to pivot upward about the pivot pin 532, thereby increasing the size of the accumulation space 517. The full position described above can reflect an opening height 588 of the retrieval port 519 as shown. The height 588 can range from approximately 0 inches to approximately 24 inches. In a preferred embodiment, the height 588 can be approximately 12 inches. The weight of the top holding portion 504 can be such that it can be readily lifted due to the dunnage pressure and does not cause undue back up into the crumpling mechanism 16 or overly crush the accumulating dunnage 40. However, the weight of the top holding portion 504 can also be such that it provides sufficient resistance to inadvertent dunnage escape out of the retrieval port 519 of dunnage handler 18.

Where the accumulation of dunnage 40 lifts the top holding portion 504, at some point, the accumulation of dunnage 40 and the associated upward motion of the top holding portion 504 will reach a full condition. This position can be defined by limiting the upward motion of the top holding portion 504 to a point where the trailing end portion 530 of the top holding portion 504 maintains a slightly downward slope as shown in FIG. 2. In this position, the top holding portion 504 may not provide as much resistance to escape of dunnage 40 as it would in its fully downward position, but may provide enough to prevent dunnage 40 from escaping out the retrieval port 519. Alternatively, the trailing end rail angle 535 may be different, but the shape and slope is preferably sufficient to keep the accumulated dunnage 40 from falling out of the retrieval port 519, or from being pushed out by additional dunnage 40 that is being fed into the accumulation space 517.

A sensor 542, as shown in FIG. 9*a*, can be included for monitoring the range of motion of the top holding portion 504 and, in particular, for monitoring when the top holding portion 504 is in the full position. Suitable types of sensors 542 can be used, such as pressure sensors, motion sensors, and contact sensors. In a preferred embodiment, a micro-switch may be used. In one embodiment, the sensor 542 is positioned at or near the connection of the top holding portion 504 to its respective support structure and the sensor 542 can be adapted to sense the position of the track pin 538. In the embodiment shown in FIG. 9*a*, the sensor is a switch that is opened or closed by contact against the top holding portion 504. The sensor can include a contact prong 543, which, when pressed upon by the track pin 538 can compress into contact with an opposing prong, thus triggering a switch.

As previously discussed, the support structure for support of the top holding portion 504 can be in the form of pivoting guide plate 24. A connecting plate 534 of a top holding portion rail 514 can be positioned adjacent to the guide plate 24 and the pivot pin 532 can pivotally connect the connecting plate 534 to the guide plate 24. In this embodiment, the track pin 538 can extend through the track slot 536 and beyond the opposing surface of the guide plate 24. As shown, the sensor 542 can be positioned on the opposing side of the guide plate 24 from the connecting plate 534 and can be located near the bottom of the track slot 536. Accordingly, as the top holding portion 504 travels upward (e.g., as dunnage 40 is accumulated or the top holding portion 504 is otherwise lifted), the track pin 538 can travel toward the bottom of the track slot 536. The track pin 538 can make contact with the sensor 542 indicating that the accumulator is full. It is noted that the sensor 542 can be adjusted along the length of the track slot 536 such that the full condition can reflect the full range of motion of the top holding portion 504 or only part of the range of motion.

The sensor 542 can be a wired device or a stand alone device. The sensor 542 can be in communication with a dunnage machine controller 50 and the sensor 542 can send a signal to the dunnage machine controller 50 reflecting that the accumulator is full when the track pin 538 contacts or otherwise triggers the sensor 542. In the preferred embodiment, the dunnage machine controller 50 is configured to stop the pick up system 14 and the crumpling mechanism 16, thereby stopping the outfeed of dunnage 40 and avoiding overfilling the dunnage handler 18, upon receipt of a signal from the sensor 542 indicating that the accumulator is full. The machine controller can also be programmed for other adaptations including delaying the shut off time or adapting to on-off cycling frequencies. For example, the controller can be adapted to increase or decrease motor speeds based on the on/off cycle durations. If the cycles are low the motor can be commanded to reduce speeds allowing the process to conserve energy by running in a more preferable steady state process with a lower noise condition.

In one embodiment, as dunnage 40 is manually or otherwise removed from the dunnage handler 18, the top holding portion 504 can pivot downward about the pivot pin 532 due to the decreased amount of dunnage 40 and the effects of gravity acting on the top holding portion. The track pin 538 can travel away from the bottom of the track slot 536 and out of contact or triggering relationship with the sensor 542. The sensor 542 can then signal the dunnage machine controller to restart or start producing dunnage 40. Alternatively, the controller may require the user to indicate that additional dunnage 40 is desired. In this instance, the sensor 542 may function only to stop dunnage production without restarting.

In still other embodiments, the top holding portion 504 may be manually pivoted up to or beyond a full condition for purposes of accessing the crumpling mechanism 16, such as when a paper jamb occurs. In this embodiment, the contact of the track pin 538 with the sensor 542 may cause the sensor to indicate a full condition and the controller may stop production allowing the user to access the crumpling mechanism 16. Releasing the top holding portion 504 and allowing it to pivot back down upon the accumulated dunnage can cause the top holding portion 504 to pivot such that the track pin 538 moves out of contact with the sensor 542. As mentioned above, the controller can be configured to automatically restart production or require a user to indicate a desire for additional dunnage production.

In some embodiments, the sensor 542 can be a circuit interrupter. In this embodiment, the contact of the track pin 538 with the sensor 542 can bypass the power driving the dunnage machine 17. As such, when the top holding portion 504 pivots to a full position bringing the track pin 538 into contact with the sensor 542, the electrical power circuit running the dunnage machine 17 can be interrupted causing the dunnage machine 17 to stop producing dunnage 40. Accordingly, when the accumulated dunnage 40 is reduced and the track pin 538 moves out of contact with the sensor 542, the power circuit can become uninterrupted and the dunnage machine 17 can again produce dunnage 40.

Referring now to FIGS. 4 and 18-20 the preferred dunnage handler 18 can be used to disengage the converting portions of the dunnage machine 17, for example in the case of a paper jamb. The handler can include a handling portion connected to a support structure. The support structure can also be connected to a moveable part of the converting portion of the dunnage machine 17. Accordingly, in certain instances, motion of the handling portion can cause corresponding disengaging motion of the moveable part causing disengagement of the converting portion of the dunnage machine 17. The disengaging motion can be pivotal or translational. Other disengaging motions can be provided.

As previously described, one or more support structures in the form of pivoting guide plates 24 can be provided. The pivoting guide plates 24 can be pivotally supported on the pivoting guide plate high-speed roller shaft 326 and can further support the pivoting guide plate low-speed roller 308 in an opposing position to the fixed guide plate low-speed roller 306. Accordingly, pivoting motion of the pivoting guide plate 24 can cause low-speed roller 308 to move away from low-speed roller 306 thereby disengaging the crumpling mechanism 16.

Referring now to FIG. 4, the support structures of the dunnage machine can be connected to one another via a connecting member such that the support structures move in unison. Preferably, the connecting member is in the form of a support structure coupling shaft 550 extending transversely between each of the pivoting guide plates 24. The shaft 550 can extend through a bore 554 provided in each of the guide plates 24 and can be pivotally or fixedly positioned therein. The bore 554 may be positioned a distance from the pivoting guide plate high-speed roller shaft 326 creating a first lever arm 556 as shown in FIGS. 9*a* and 19.

The coupling shaft 550 may extend through the guide plates 24 and, as show in FIG. 20, through the pulley separation wall 572 on one side of the dunnage machine 17 and through a motor separation wall 574 on an opposing side of the dunnage machine 17. As further shown in FIG. 18, each of the pulley separation wall 572 and the motor separation wall 574 may include an arcuate slot 558 for receiving the coupling shaft 550. The slot 558 preferably has a width close to, but larger than the diameter of the coupling shaft 550 and may have radiused shaped ends with a radius to correspond with the cross section of the coupling shaft 550. The slot 558 may also be defined by an outer radius and an inner radius, both of which have a center point generally aligned with the center point of the shaft 326. As such, pivoting motion of the pivoting guide plates 24 about the shaft 326 may cause radial motion of the coupling shaft 550 that naturally follows the path defined by the arcuate slotted hole 558. It is noted that the motion of the pivoting guide plate 24 in the preferred embodiment is defined by its pivotal support upon the shaft 326 and the slot 558 functions to allow passage of the shaft 550 through the separation wall. As such, the slot 558 can be a less defined opening that can be significantly larger than the coupling shaft 550. In other embodiments, where the motion of the support structure is less defined, the particular shape of the slot 558 can guide the motion of the support structure.

The coupling shaft 550 is preferably associated with a support structure biasing element 552 to bias the support structures to maintain operational contact between the opposed low-speed rollers 306, 308. As shown in FIGS. 4 and 9, the support biasing element 552 includes two compression springs 562 disposed laterally outside the crumpling mechanism 16, preferably beyond separation walls 572, 574, and pushing upwards against the coupling shaft 550 to pivot the support structures towards the operational position. The coupling shaft 550 can include bores 560 to ride over stabilizing rods 564 or other spring guides on which the compression springs 562 are mounted to keep them biased against the coupling shaft 550. The bores 560 can be oversized to allow the coupling shaft 550 to rotate relative to the stabilizing rod as the support structures pivot. As shown in FIG. 9*a*, the stabilizing rod 564 may be pivotally supported at its end opposite from the coupling shaft 550 to allow the rod 564 to pivot as the shaft 550 moves radially about the axis of the pivot shaft 326. A biasing seat 566 may be positioned on the rod 564 and the compression spring 562 can be compressed between the coupling shaft 550 and the biasing seat. The biasing seat 566 can be adjustable to change the characteristics of the dunnage. That is, where the seat 566 is positioned to cause higher spring compression, the force between rollers 308 and 306 can be higher thereby creating more force within the crumpling mechanism.

As shown in FIG. 9*a*, an engaged position of the pivoting guide plate low-speed roller 308 may be such that it abuts the fixed guide plate low-speed roller 306 on an opposing side of the crumple zone 310. The biasing mechanism 552 biases the coupling shaft 550, and thus the guide plates 24, biasing the low-speed roller 308 toward abutment with the opposing low-speed roller 306. The compressive force provided by the spring 562 on the surface of the coupling shaft 550 can create a force on the guide plates 24 via the bore 554 through which the coupling shaft 550 passes. The force on the guide plate 24 in the preferred embodiment is offset from the shaft 326 a first lever arm distance 556. This force induces a torque on the guide plates 24 selected to cause the guide plates 24 to rotate about the shaft 326 to bias the crumpling rollers 308, 306 against each other with a desired force to sufficiently keep the low-speed rollers 308, 306 in contact with each other and to grip and crumple the sheets, while releasing the sheets in response to a preselected force caused by a jam of the sheets in the crumpling zone 310.

Referring now to FIG. 17, the biasing force of the biasing mechanism 552 is preferably selected so that it is overcome in certain situations, causing the low-speed rollers 308, 306, to separate as shown. The crumpling mechanism 16 may build up pressure in a sheet jamb due to the high-speed rollers 302, 304 advancing paper more quickly than the low-speed rollers 308, 306 creating an undesired back up of paper. In some embodiments, the internal forces on the low-speed rollers 308, 306 may increase sufficiently to overcome the torque on the guide plate 24. That is, the pressure on the crumpling zone side of the low-speed rollers 308, 306 may transmit a force through the pivoting guide plate low-speed roller shaft 322 of the low-speed roller 308 to the guide plate 24. The force on the roller 308 may act on the guide plate 24 at the low-speed roller shaft 322 location, which is spaced apart from the shaft 326 of the guide plate 24 defining a second lever arm 568. Where the torque caused by the force on the low-speed roller 308 is greater than the torque caused by the biasing force of the biasing mechanism 552, the crumpling mechanism 16 becomes disengaged. In this instance, the low-speed rollers 308, 306 are allowed to move apart, allowing the dunnage 40 to escape therefrom.

The biasing force preferably can also be overcome manually in the preferred embodiment. That is, the guide plate 24 can be physically rotated in a direction opposite to the biasing force. This may be desired in cases where a jamb has occurred and access to the crumpling zone 310 is required. In the embodiment shown, the top holding portion 504 of the dunnage handler 18 can be pivoted about its pivot pin 532 through a range of handling positions between a start position and a full position. In the full position, the track pin 538 engages the sensor 542. As discussed above, where the top holding portion 504 is pivoted to bring the track pin 538 into contact with the sensor 542, production of dunnage can be interrupted. Where disengagement of the converting portion of the dunnage machine is desired, the top holding portion 504 may be further pivoted beyond the full position until the track pin 538 engages the ends of the track slot 536. This may define a transition position in that motion of the top holding portion 504 beyond this position will begin to cause motion of the pivoting guide plate 24 in conjunction with the top holding portion 504. It is noted that the full position and the transition position can be the same position where, for example, the track pin 538 abuts the end of the track slot 536 at the same point at which the sensor 542 is triggered. As the top holding portion 504 is pivoted further, beyond the transition position, the top holding portion 504 and the pivoting guide plate 24 may begin to pivot together about the shaft 326. In this embodiment, the distance from the force on the top holding portion 504 of the dunnage handler 18 defines a third lever arm 570. When the torque caused by the force on the top holding portion 504 of the dunnage handler 18 over the third lever arm 570 is greater than the torque caused by the biasing force over the first lever 556 arm, the low-speed rollers 308, 306 are caused to separate. When the top holding portion 504 and the pivoting guide plate 24 are pivoted such that the low-speed rollers 308, 306 separate, the top holding portion 504 can be said to be in a release position. Depending on the force applied to oppose the biasing force, more or less separation between the rollers 308, 306 can be provided. In some embodiments, the separation between the rollers 308, 306 may be limited by the motion of the coupling shaft 550 in the slot 558. In the present embodiment, the high-speed rollers 302,304 are not separated when the low-speed rollers 308, 306 are separated by the opening of the dunnage handler 18, although other arrangements can be employed.

In some embodiments, the top holding portion 504 of the dunnage handler 18 may be pivoted by grasping and lifting from one or a plurality of the top rails 514. In some embodiments, a crossbar 518 may be grasped and lifted to pivot the top holding portion 504. In either case, the use of the top holding portion 504 to disengage the crumpling mechanism 16 can advantageously provide an increased lever arm to overcome the torque tending to keep the crumpling rollers 308, 306 engaged against each other by the biasing mechanism 552. Also, by using the top holding portion 504 to move the guide plate 24, the top holding portion 504 is naturally cleared from the path of access to the crumpling zone 310 allowing the jamb or other obstruction to be removed, and relieving back pressure that may be caused on the crumpling mechanism 16 by dunnage 40 accumulated in the handler 18. Moreover, where the top holding portion is used to release the abutment between the two low-speed rollers 308, 306, inadvertent motion of the crumpling mechanism 16 may be avoided since the track pin 538 will have moved up to or beyond the sensor 542 causing the production of dunnage to be interrupted.

In another embodiment, the biasing mechanism 552 may be a piston type mechanism, balloon, elastic material, or other known biasing mechanism. Moreover, the biasing mechanism 552 may be tensile in lieu of compressive. Gravity may be used to provide the desired biasing in other embodiments. The biasing mechanism 552 can include single elements, such as a spring, or multiple biasing elements.

Referring again to FIG. 8, as dunnage 40 passes through and is fed out of the dunnage machine 17, the lateral position of the crimped regions 44 of the dunnage 40 may correspond to guides. Preferably, the guide plates 26, 24 and the top and bottom rails 508, 514 are in alignment with one another and act as guides. As shown in FIG. 4, each set of low-speed and high-speed rollers (e.g., 306 and 302 or 308 and 304) can be positioned to laterally straddle the location of the fixed guide plate 26 or the pivoting guide plate 24. That is, as shown, the low-speed rollers 308, 306 are positioned on an opposing side of the fixed guide plate 26 and the pivoting guide plate 24 from the high-speed rollers 304, 302. As such, the center of the crumpling mechanism 16 and, thus, the center of the crimped regions 44 are located laterally near, and preferably at, the location of the guide plates 24, 26. As shown, the bottom rails 508 of the bottom holding portion 502 can extend from a position adjacent to the group of crumpling rollers 302, 304, 306, 308. Preferably, the bottom rails 508 extend from between the rollers 302, 304, 306, 308 and thus are in alignment with the center of the crumpling mechanism 16. The top rails 514 of the top holding portion 504 can be slightly offset from the bottom rails 508. The coupling plate 534 is relatively thin allowing the center of the top rails 514 to be positioned more or less in line with the edge of the support structure. This offset position can allow the top rails 514 to close and laterally overlap the bottom rails 508, while still maintaining the top rails 514 in general alignment with the crumpling mechanism 16.

As discussed, the guides are preferably positioned so that when dunnage 40 exits the dunnage machine 17, the crimped regions 44 of the dunnage 40 are generally positioned and preferably also in alignment, with the guides. As shown in FIG. 8 and described above, the crimped regions 44 result from passage through the crumpling zone 310 of the crumpling mechanism 16 and include a multitude of creases. The series of creases in the crimped region 44 can create a narrowing in the dunnage 40 at the crimped regions 44 when viewed from above. Moreover, referring to FIG. 21, the crimped region 44 can include more creases than the other portions of the dunnage 40. Accordingly, the crimped regions 44 can reflect a narrowing in the dunnage 40 at the crimped regions 44, when viewed from the front as well. Accordingly, the crimped regions create a natural tendency for the dunnage 40 to maintain its alignment with the guides. As such, the guides may assist in maintaining control of the dunnage 40 when the dunnage handler 18 is accumulating dunnage 40 by preventing the dunnage 40 from leaking, shifting, or otherwise escaping out the lateral sides of the dunnage handler 18. Moreover, where the dunnage handler 18 is being used to discharge dunnage 40, the guides may assist in controlling the path of the dunnage 40 as it passes through the dunnage handler 18. As such, where the dunnage 40 is being directed into a container, onto a conveyor, or otherwise, the guides may assist in controlling the direction of the dunnage flow.

Referring to FIG. 1, a dunnage handler support housing 590 can be included. The housing 590 can enclose the connection between the top holding portion 504 and the support structure within the dunnage machine 17. The housing 590 can be pivotally positioned on the dunnage machine 17. The housing 590 can be affixed to the top holding portion 504 of the dunnage handler 18 and can pivot together with the handler 18. Accordingly, the housing 590 can be configured to pivot about and axis aligned with the pivot pin 532. Alternatively, slots or other clearance can be provided in the housing 590 to accommodate the articulating motion of the top holding portion 504.

In use, a dunnage machine 17 may feed cross-crumpled dunnage 40 into the intake area 501 of the dunnage accumulator. The top holding portion 504 may initially be in a starting position. The starting position may be defined by the top holding portion 504 being pivoted to a first end of its range of motion. The dunnage 40 may travel through the accumulation space 517 until it encounters an accumulation feature 516, 514 of the top and/or bottom holding portion 504, 502, the lower surface of the top holding portion 504, or other dunnage 40, at which point, the dunnage motion may be arrested. As the dunnage motion is arrested, the dunnage 40 entering the accumulation space 517 may accumulate and begin to pile up. As this occurs, the dunnage 40 may reach the lower surface of the top holding portion 504 and begin exerting pressure on the top holding portion 504. As the pressure increases, the top holding portion 504 may begin to pivot about its pivot pin 532 to accommodate the accumulating dunnage 40. This process may continue until the top holding portion 504 reaches a full condition. Where a sensor 542 is included, the production of dunnage 40 may be interrupted when the top holding portion 504 reaches a full condition. During the production of dunnage 40 and/or when production of dunnage 40 has stopped, dunnage 40 may be removed from the dunnage accumulator by retrieving it from the retrieval port 519. That is, packing personnel, devices, or other equipment may grasp the dunnage 40 in the accumulator and pull it through the retrieval port 519. Alternatively or additionally, the dunnage 40 may be pulled through the space between the rails 514, 508 of the top and bottom holding portions 504, 502 and/or out the lateral sides of the dunnage accumulator. As dunnage accumulation is reduced, the top holding portion 504 may pivot away from the full condition back toward the start position and the sensor 542 may restart dunnage 40 production.

In the case of a dunnage production jamb, the dunnage handler 18 can be used to free the jamb. Preferably, a user can grasp a portion of the top holding portion 504 by grasping a top rail 514 or a crossbar 518 and lifting the dunnage handler 18 out of contact with the surface of the accumulated dunnage 40. The top holding portion 504 can be pivoted about its pivot pin 532 to a transition position where the top holding portion 504 and the pivoting guide plate 24 begin to rotate together about the shaft 326. This transition position may be where the track pin 538 travels to the fully counterclockwise position in the track slot 536 or another stopping point can be provided. Additionally, the transition point is preferably at or beyond the full position of the top holding portion 504 such that the process of disengaging the crumpling mechanism 16 also interrupts the production of dunnage 40. That is, moving the top holding portion 504 to or beyond the full position can preferably trigger the sensor 542 and interrupt the dunnage 40 production. The top holding portion 504 and the pivoting guide plate 24 can be pivoted about the shaft 326 to disengage the crumpling mechanism 16 by creating separation of the low-speed rollers 308, 306.

While the dunnage handler 18 has been described in detail, several modifications can be made and still be within the scope of the present invention. For example, the top and bottom holding portions 504, 502 can be in the form of a rigid and/or flexible flap material in lieu of the rails 508, 514 described. In other embodiments, the first and second portions 524, 526 of the bottom rail 508 described above may be positioned adjacent to one another and laterally spaced from one another rather than above and below one another. In other embodiments, the accumulation features 516, 510 of the top and/or bottom holding portions 504, 502 can be in the form of hooks, gripping surfaces, or other arresting mechanisms in lieu of the eye type shapes described. The accumulation features 510, 516 may be uncoupleable from the rails 508, 514 and may be adjustable along the length of the rails 508, 514. An additional modification can include diagonally extending, or otherwise non-perpendicularly extending, crossbars 518. A handle can also be secured to the outer surface of one or both of the holding portions 504, 502. In other embodiments, regarding the range of motion of the top holding portion 504, the downward direction can be limited or unlimited. Where it is limited, a shelf, ledge, or other vertical support at the trailing end of the top holding portion 504 can be included. In still other embodiments, the top and bottom holding portion 504, 502 can be connected to one another and close off the path of exiting dunnage 40. A sensor can be provided to monitor the amount of expansion and interrupt the production of dunnage 40 when a particular level of expansion is detected. In still other embodiments, the dunnage handler 18 can be a separate device and can be positioned adjacent to or remote from the dunnage machine 17 and be adapted to accumulate or discharge dunnage 40. The handler can include a connecting mechanism for anchoring the dunnage handler 18 to the dunnage machine 17. In still other embodiments, the top holding portion 504 can include a biasing mechanism, which creates a biasing force that can be overcome by accumulating dunnage 40. In still other embodiments, different orientations may be used. As such, while the terms top and bottom have been used to refer to the supports 504, 502, different orientation can be used. In still other embodiments, the bottom holding portion 502 can be pivotally connected to the dunnage machine 17 in lieu of the top holding portion 504 or both the top and bottom holding portions 504, 502 can be pivotally connected. In still other embodiments, the track slot 536 and track pin 538 can be reversed.

The above described handler can have certain advantages. For example, the outward/downward sloping trailing end portion 530 of the top rail 514 can serve at least two purposes. First, this trailing end 530 can interact with the accumulating dunnage 40 and ride on the dunnage 40 to naturally create the upward motion of the top holding portion 504. Second, this outward/downward sloping trailing end 530 can also allow for more accumulation of dunnage 40 than would be available with, for example, a straight top holding portion 504. That is, as the generally elongate dunnage 40 is accumulated, and additional dunnage 40 is fed out of the dunnage machine 17, the tendency of the accumulated dunnage 40 to escape out the trailing end 505 of the dunnage handler 18 increases. However, the downward sloping trailing end 530 can function to maintain a component of force opposite to the handling direction 522 thereby resisting this outflow of dunnage 40. This is in contrast to an alternative straight top holding portion that may not have this opposing component of force. That is, once a straight top holding portion is rotated beyond the horizontal position its weight may include a component of force along the handling direction 522 rather than opposite to the handling direction 522. This may cause the weight of the support to contribute to the tendency of the dunnage 40 to escape.

Another advantage of the described handler 18 relates to its tendency to set the shape of the dunnage 40. In some cases, dunnage 40 in the form of crumpled paper dunnage may have a tendency to return to its pre-crumpled shape and thus slightly uncrumple or expand upon exiting the dunnage mechanism 16. By accumulating the dunnage 40 in the dunnage handler 18, the crumpled dunnage 40 may experience a varying amount of setting force or compression that acts to hold the shape of the dunnage 40 for a period of time thereby setting its shape.

One having ordinary skill in the art should appreciate that there are numerous types and sizes of dunnage for which there can be a need or desire to accumulate or discharge according to an exemplary embodiment of the present invention. Additionally, one having ordinary skill in the art will appreciate that although the preferred embodiments illustrated herein reflect a round rail steel rod or tube type construction, the dunnage handler can be constructed of different materials with differing cross-sections, e.g., square, triangular, oval, rectangular, or another cross-section.

As used herein, the terms “top,” “bottom,” and/or other terms indicative of direction are used herein for convenience and to depict relational positions and/or directions between the parts of the embodiments. It will be appreciated that certain embodiments, or portions thereof, can also be oriented in other positions.

In addition, the term “about” should generally be understood to refer to both the corresponding number and a range of numbers. In addition, all numerical ranges herein should be understood to include each whole integer within the range. While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A method of producing a transversely crumpled dunnage unit, comprising:

operating a first set of entry-side crumpling members engaged with opposite faces of a stock material at a first entry-engagement location on a first transverse side of a first transverse region of the stock material, to advance the stock material on the first transverse side along a path at an entry rate; and operating a first set of exit-side crumpling members engaged with the opposite faces of the stock material at a first exit-engagement location downstream of the first set of entry-side crumpling members and on a second transverse side of the first transverse region of the stock material transversely opposite from the first transverse side, such that the first set of entry-side crumpling members and the first set of exit-side crumpling members define a crumpling zone therebetween in the first transverse region, to move the stock material at an exit rate that is slower than the entry rate, thereby retarding the advancing stock material on the second transverse side and causing a shearing within the stock material in the crumpling zone, which shearing creases the stock material in the first transverse region, which creasing forms a first crimped region along the first transverse region that includes interlocked compressed folds, wherein the first set of entry-side crumpling members and the first set of exit-side crumpling members are offset laterally to define a space laterally adjacent to the exit-side crumpling members directly downstream along the path from the entry-side crumpling members and to define another space laterally adjacent the entry-side crumpling members directly upstream along the path from the exit-side crumpling members, and wherein a size of the space is selected to cause sufficient shearing to increase creasing while preventing tearing of the stock material.

2. The method of claim 1, wherein the shearing of the stock material is such that the crimped region has a criss-crossing pattern.

3. The method of claim 1, wherein:

the first entry-side and exit-side crumpling members comprise rollers, and the first entry-side crumpling rollers overlap the first exit-side crumpling rollers in a longitudinal direction that extends along the path.

4. The method of claim 1, the method further comprising:

operating a second set of entry-side crumpling members engaged with the opposite faces of the stock material at a second entry-engagement location on a first transverse side of a second transverse region of the stock material that is adjacent to the first transverse region of the stock material to advance the stock material on the first transverse side of the second transverse region along a path at the entry rate; and operating a second set of exit-side crumpling members engaged with the opposite faces of the stock material at a second exit-engagement location downstream of the second set of entry-side crumpling members and on a second transverse side of the second transverse region of the stock material transversely opposite from the first transverse side, such that the second set of entry-side crumpling members and the second set of exit-side crumpling members define a second crumpling zone therebetween in the second transverse region, to move the stock material at an exit rate that is slower than the entry rate, thereby retarding the advancing stock material on the second transverse side and causing a shearing of the stock material within the second crumpling zone, which shearing creases the stock material in the first transverse region, which creasing forms a second crimped region along the second transverse region that includes interlocked compressed folds.

5. The method of claim 4, wherein the shearing of the stock material is such that both of the crimped regions have criss-crossing patterns.

6. The method of claim 4, wherein the second set of entry-side crumpling members are offset laterally with respect to the second set of exit-side crumpling members to define a space within the second crumpling zone that is laterally adjacent the second set of exit-side crumpling members at a location directly downstream along the path from the entry-side members, and to define another space within the second crumpling zone that is laterally adjacent the second set of entry-side crumpling members at a location directly upstream along the path from the second set of exit-side crumpling members, to cause shearing of the stock material in the second transverse region of the stock material within the second crumpling zone.

7. The method of claim 4, wherein the first entry-side and first exit-side crumpling members and the second entry-side and second exit-side crumpling members are operated to form common compression folds having a lower frequency than the compressed folds formed in the first and second crimped regions, which common folds are locked in by the first and second crimped regions and are disposed transversely between the first and second transverse regions of the stock material.

8. The method of claim 1, wherein the shearing crumples the stock material along axes that are non-orthogonal with respect to the longitudinal path.

9. The method of claim 8, wherein the shearing crumples the stock material along axes that are up to 10 degrees to 20 degrees with respect to the longitudinal path.

10. The method of claim 1, wherein the stock material is comprised of a roll of paper.

11. The method of claim 1, wherein the stock material is comprised of a stack of paper.

12. The method of claim 11, wherein the stack is formed of a long sheet of material.

13. The method of claim 11, wherein the stack is formed of a plurality of attached sheets.

14. The method of claim 11, wherein the stack of paper is formed of a plurality of separate individual sheets of paper.

15. The method of claim 1, wherein the stock material is an elongated sheet material provided in a roll or as a stack of a plurality of attached sheets.

16. The method of claim 1, wherein the first set of entry-side crumpling members are disposed completely out of alignment with respect to the first set of exit-side crumpling members downstream along the path such that the first set of entry-side crumpling members move the sheet material at a first location and the first set of exit-side crumpling members cause resistance against the sheet material at a location different from the first location.

17. The method of claim 1, wherein:

the first set of exit-side crumpling members includes:
- a first exit-side crumpling member, and
- a second exit-side crumpling member; and the first set of entry-side crumpling members includes:
- a first entry-side crumpling member, and
- a second entry-side crumpling member.

18. The method of claim 17, wherein each of the first and second exit-side crumpling members has a surface, the surface of the first exit-side crumpling member in substantially continuous abutment against the surface of the second exit-side crumpling member to pinch the sheet material in the exit throughout rotation of the exit-side members.

19. The method of claim 1, wherein the crumpling zone is generally defined by the entry and exit-side crumpling members to have a generally diamond shaped in a lateral-view cross-section, and the crumpling zone comprising an entry-zone, a feed-zone, and exit-zone.

20. The method of claim 1, wherein the first set of entry-side crumpling members and the first set of exit-side crumpling members are spaced laterally from each other sufficiently to allow the shearing of the sheet in the crumpling zone.

21. The method of claim 20, wherein the first set of entry-side crumpling members and the first set of exit-side crumpling members are spaced laterally from each other sufficiently to prevent tearing of the stock material in the crumpling zone.

22. The method of claim 1, wherein the first entry-side and first exit-side crumpling members are operated to form common compression folds having a lower frequency than the compressed folds formed in the crimped region, which common folds are locked in by the first crimped region.

23. The method of claim 1, wherein the first set of exit-side crumpling members are operated to avoid retarding the stock material in the first transverse region directly downstream of the entry-side crumpling members, transversely adjacent from the exit-side crumpling members.

24. The method of claim 1, wherein the lateral offset between the entry and exit-side crumpling members is such that the stock material is not impeded by the exit-side crumpling members in the space laterally adjacent to the exit-side crumpling members directly downstream along the path from the entry-side crumpling members.

* * * * *